(12) United States Patent
Jeong et al.

(10) Patent No.: US 11,885,538 B2
(45) Date of Patent: Jan. 30, 2024

(54) REFRIGERATOR

(71) Applicant: LG ELECTRONICS INC., Seoul (KR)

(72) Inventors: Junseong Jeong, Seoul (KR); Seokhyun Kim, Seoul (KR); Sangoh Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 297 days.

(21) Appl. No.: 17/299,705

(22) PCT Filed: Dec. 6, 2019

(86) PCT No.: PCT/KR2019/017188
§ 371 (c)(1),
(2) Date: Jun. 3, 2021

(87) PCT Pub. No.: WO2020/116987
PCT Pub. Date: Jun. 11, 2020

(65) Prior Publication Data
US 2022/0057121 A1    Feb. 24, 2022

(30) Foreign Application Priority Data

Dec. 6, 2018 (KR) .......................... 10-2018-0155645

(51) Int. Cl.
*F25B 39/02* (2006.01)
*F25D 23/06* (2006.01)

(52) U.S. Cl.
CPC ............ *F25B 39/02* (2013.01); *F25D 23/065* (2013.01)

(58) Field of Classification Search
CPC ........ F25B 39/02; F25D 23/065; F25D 21/00; F25D 21/002; F25D 21/004; F25D 21/006; F25D 21/08; F25D 21/02; F25D 29/00; F25D 2600/02; F25D 2600/06; F25D 2700/10; F25D 2700/12
USPC .......................................................... 62/216
See application file for complete search history.

(56) References Cited

U.S. PATENT DOCUMENTS

2004/0011067 A1    1/2004  Park et al.
2009/0254220 A1*  10/2009  Shin ........................ F25D 11/02
                                                          62/157

FOREIGN PATENT DOCUMENTS

| CN | 102472549 A | 5/2012 | |
|----|----|----|----|
| CN | 105806006 A | 7/2016 | |
| CN | 207095130 U | 3/2018 | |
| EP | 1808659 A2 * | 7/2007 | ............. A23G 9/045 |

(Continued)

*Primary Examiner* — Justin M Jonaitis
(74) *Attorney, Agent, or Firm* — BRYAN CAVE LEIGHTON PAISNER LLP

(57) ABSTRACT

A refrigerator comprising a fan to operate for supplying cold air to a cooling chamber; an RF output device disposed in the cooling chamber, and for outputting an RF signal into a cavity in the cooling chamber; and a controller for controlling the RF output device, wherein the controller is configured to output the RF signal to goods in the cavity, and to operate in a first section in which temperature of the goods falls, and a second section in which the temperature of the increases after the first section and maintains, wherein when the RF output device operates, a temperature of the cavity is higher than a temperature of other area in the cooling chamber. Accordingly, the freshness of the goods in the refrigerator can be maintained by using the RF signal.

20 Claims, 20 Drawing Sheets

(56) References Cited

FOREIGN PATENT DOCUMENTS

| | | | |
|---|---|---|---|
| EP | 2322883 A1 | 5/2011 | |
| JP | 60259171 A | 12/1985 | |
| JP | 09250867 A | 9/1997 | |
| JP | 2001-086967 A | 4/2001 | |
| JP | 2002272436 A | 9/2002 | |
| JP | 2002-333250 A | 11/2002 | |
| KR | 10-2008-0003218 A | 1/2008 | |
| KR | 10-2017-0052705 A | 5/2017 | |
| KR | 10-1765837 B1 | 8/2017 | |
| WO | WO-2007094556 A2 * | 8/2007 | ............... A23B 4/06 |
| WO | 2010071322 A2 | 6/2010 | |
| WO | WO-2011135863 A1 * | 11/2011 | ........... F25D 17/065 |
| WO | 2011152047 A1 | 12/2011 | |
| WO | WO-2011152047 A1 * | 12/2011 | ............. F25D 23/12 |

\* cited by examiner

[Figure 1]
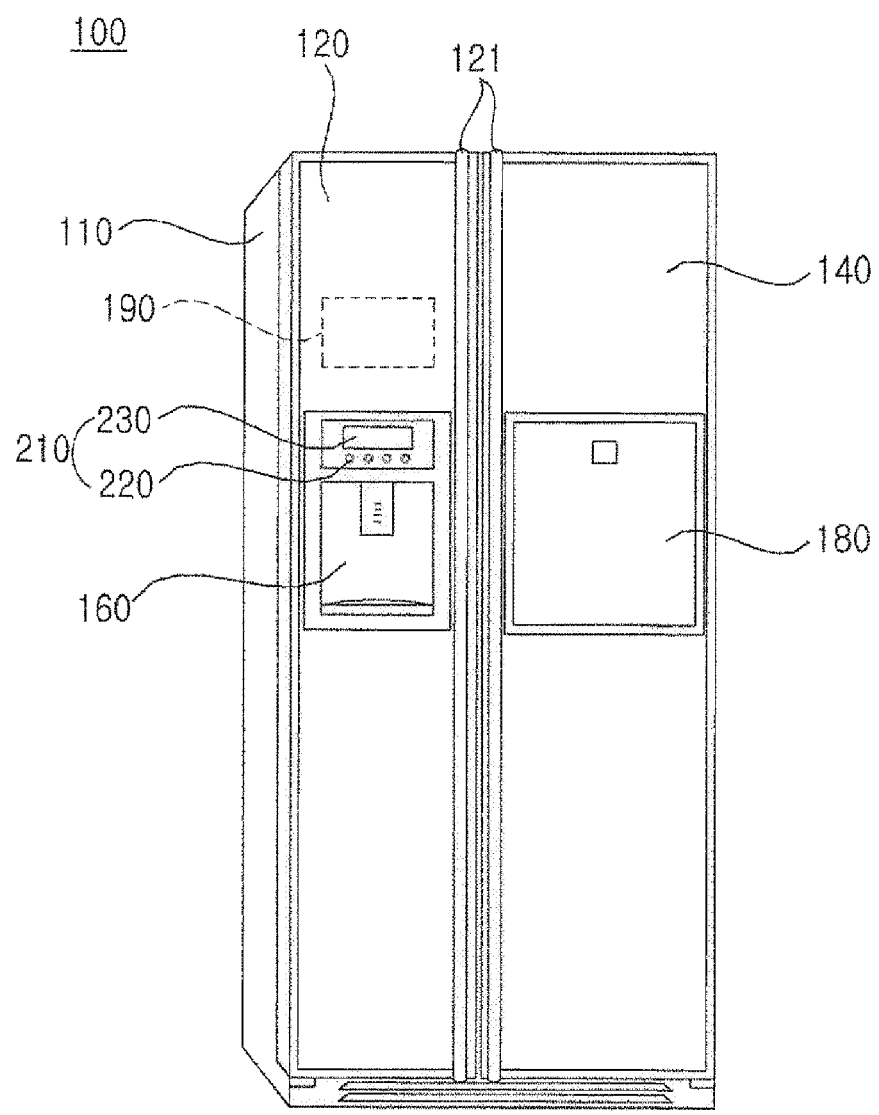

【Figure 2】
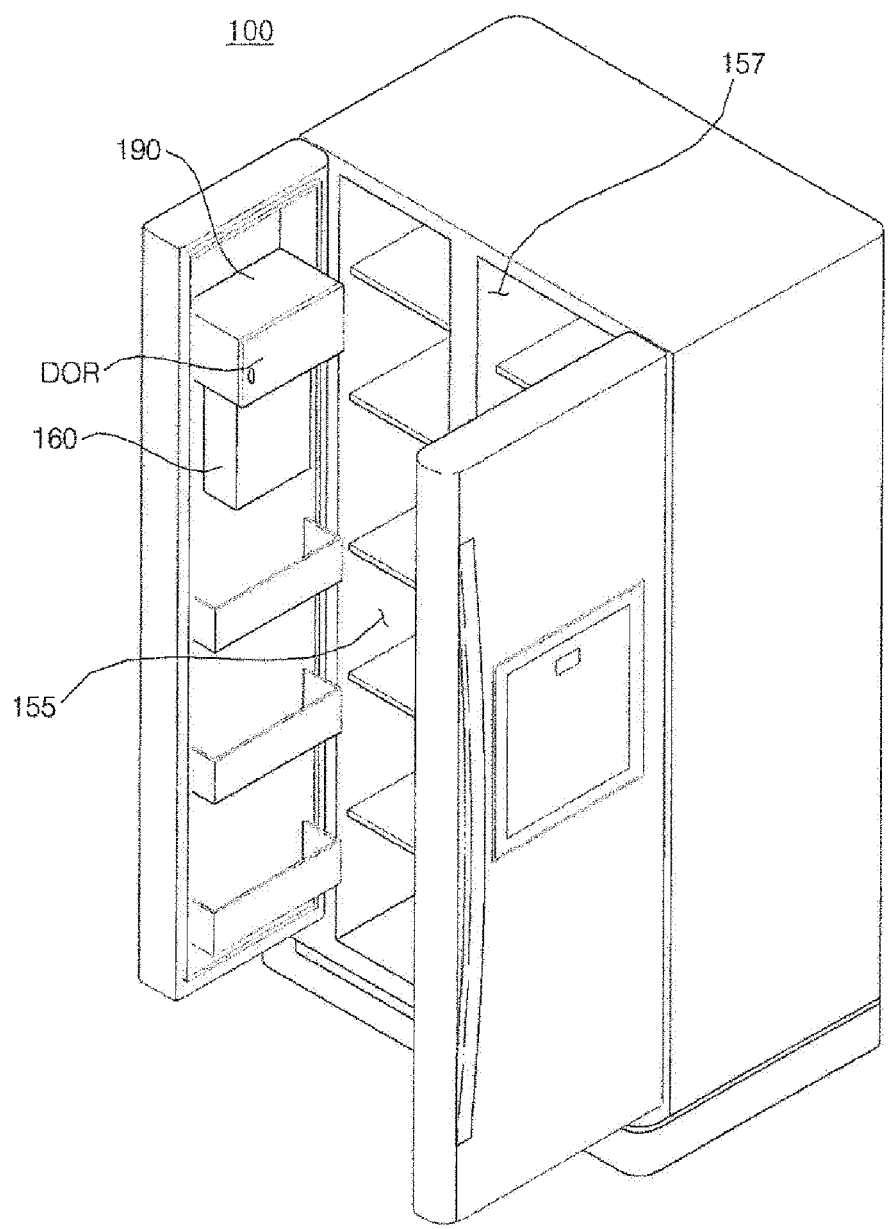

[Figure 3]
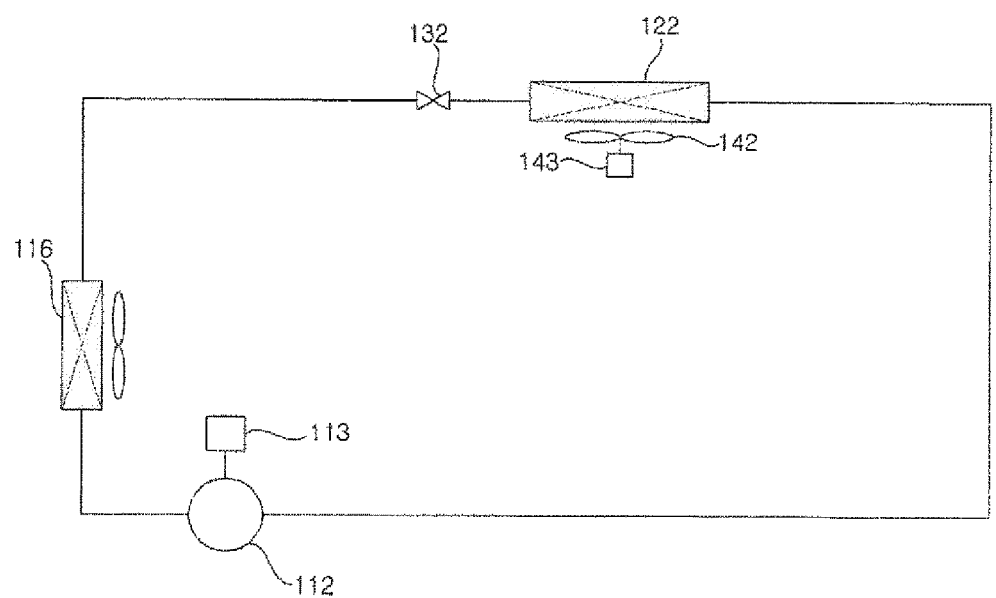

[Figure 4]
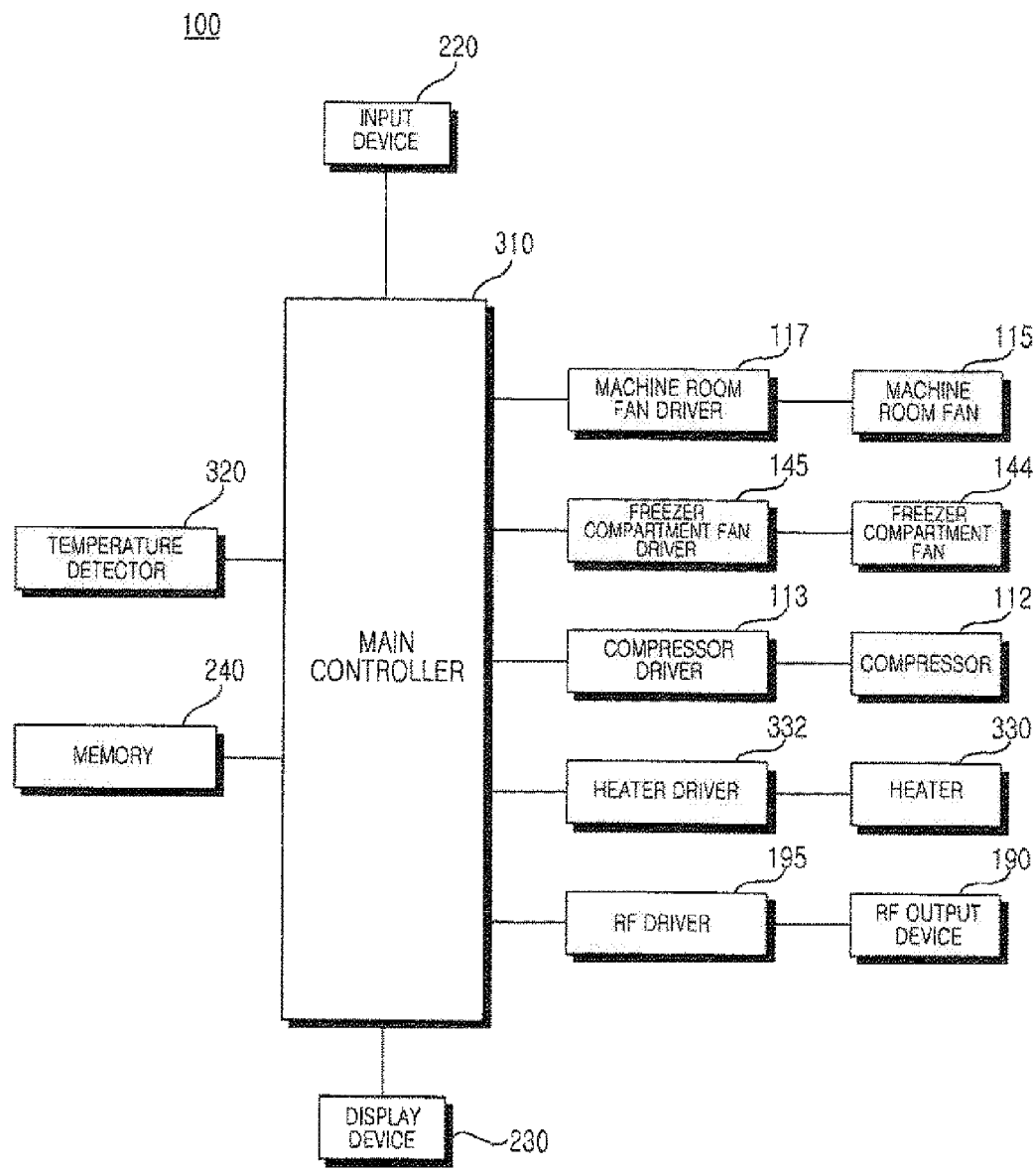

[Figure 5a]
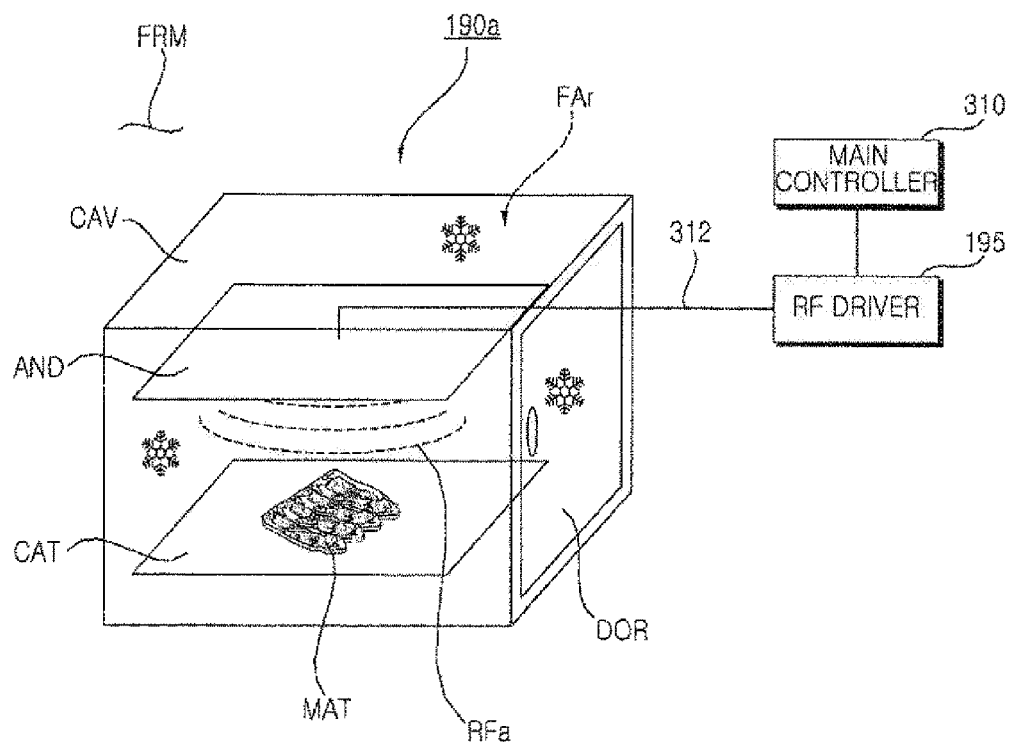

[Figure 5b]
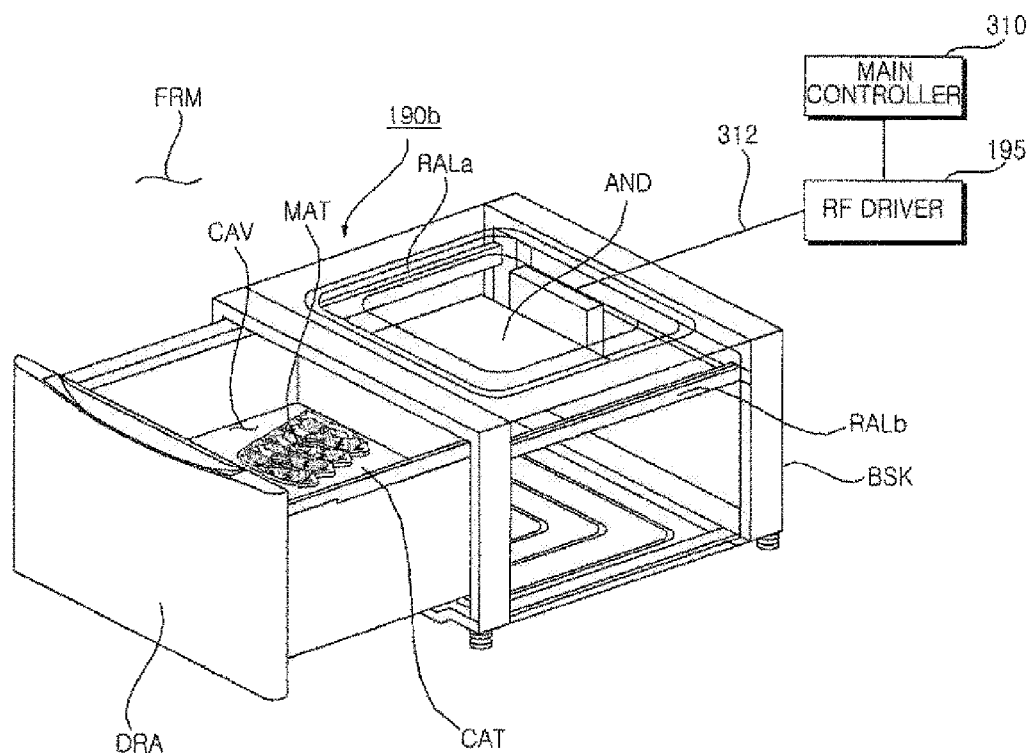

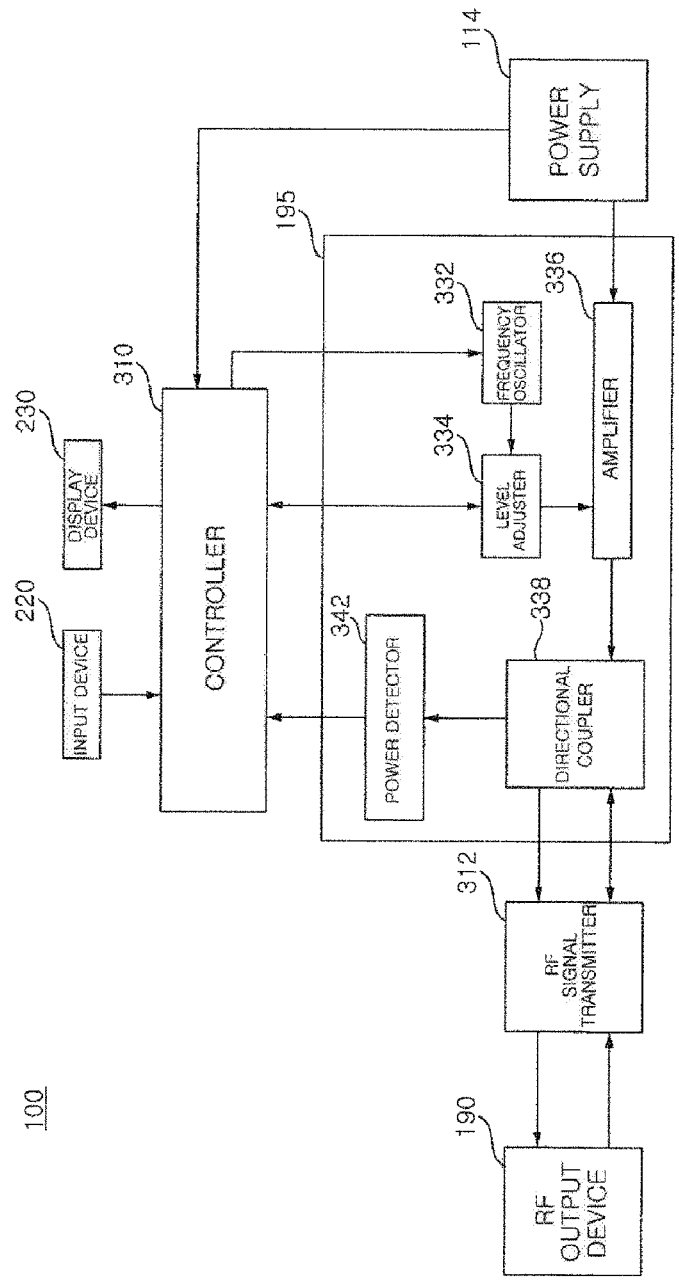
[Figure 6]

【Figure 7】
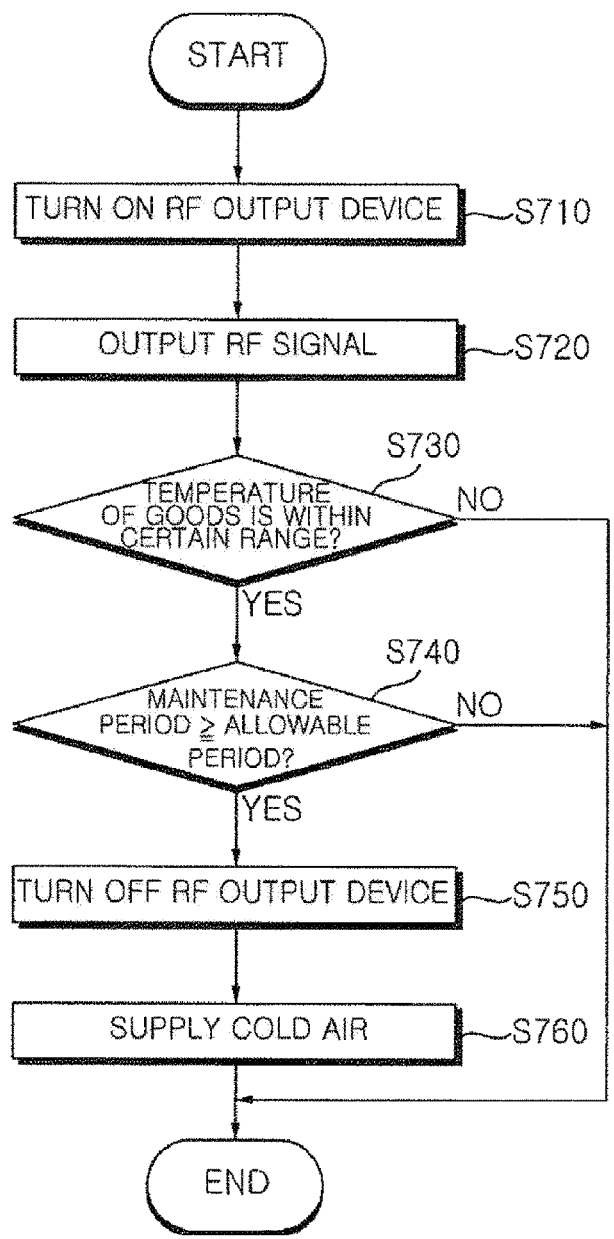

[Figure 8a]
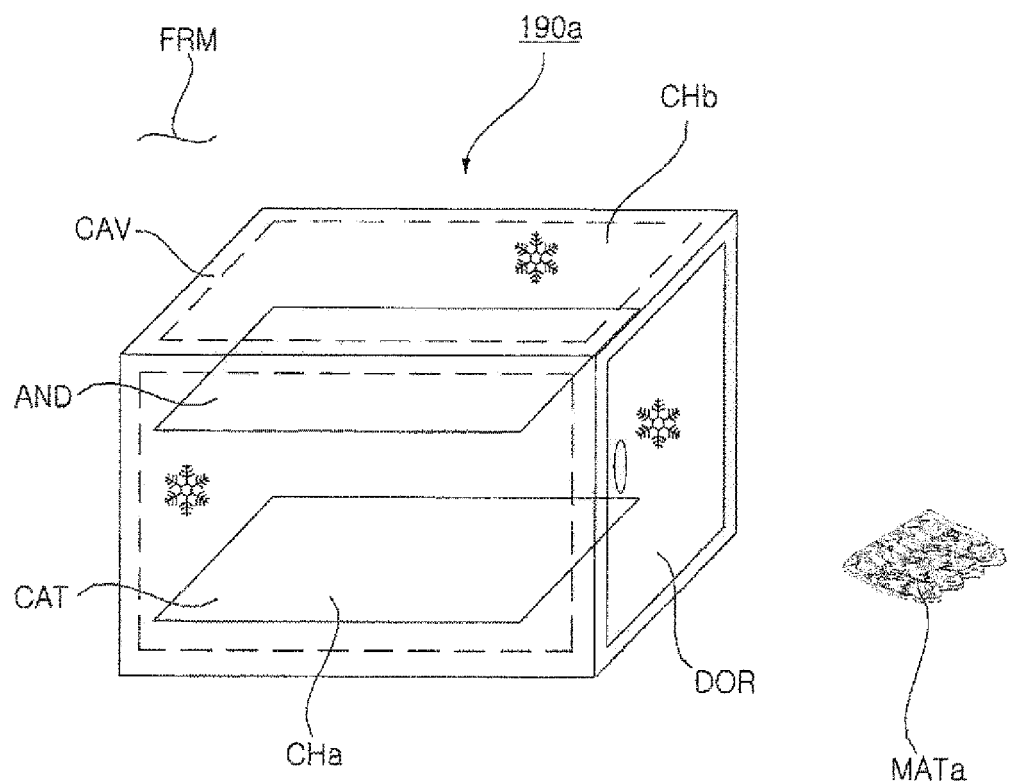

[Figure 8b]
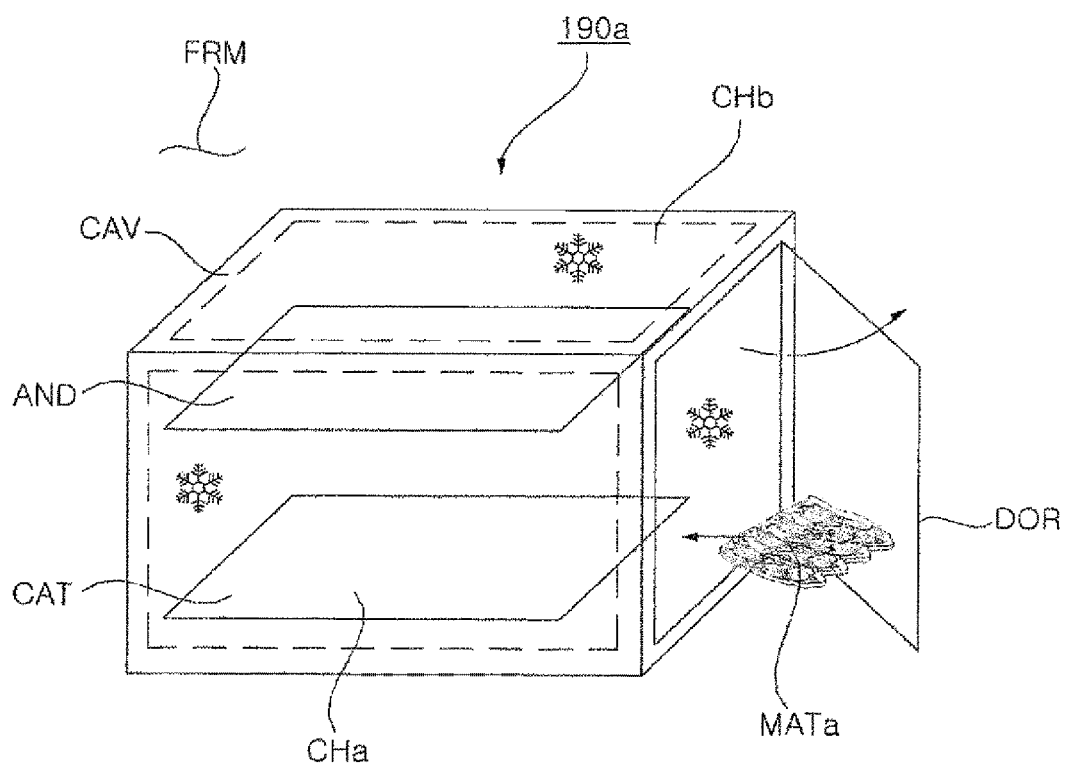

[Figure 8c]
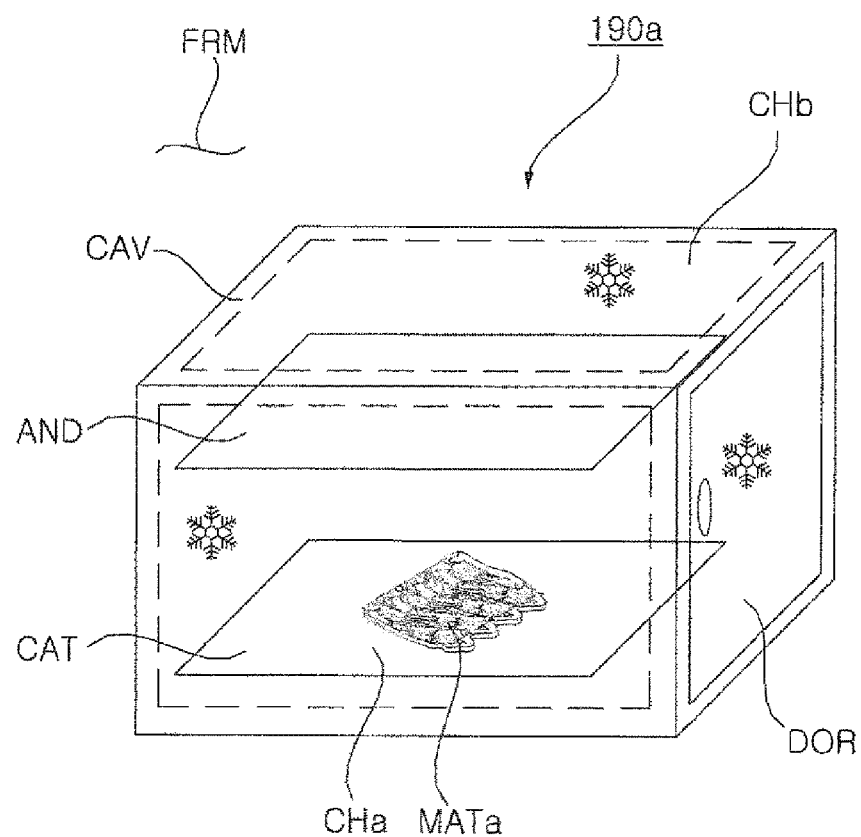

[Figure 8d]
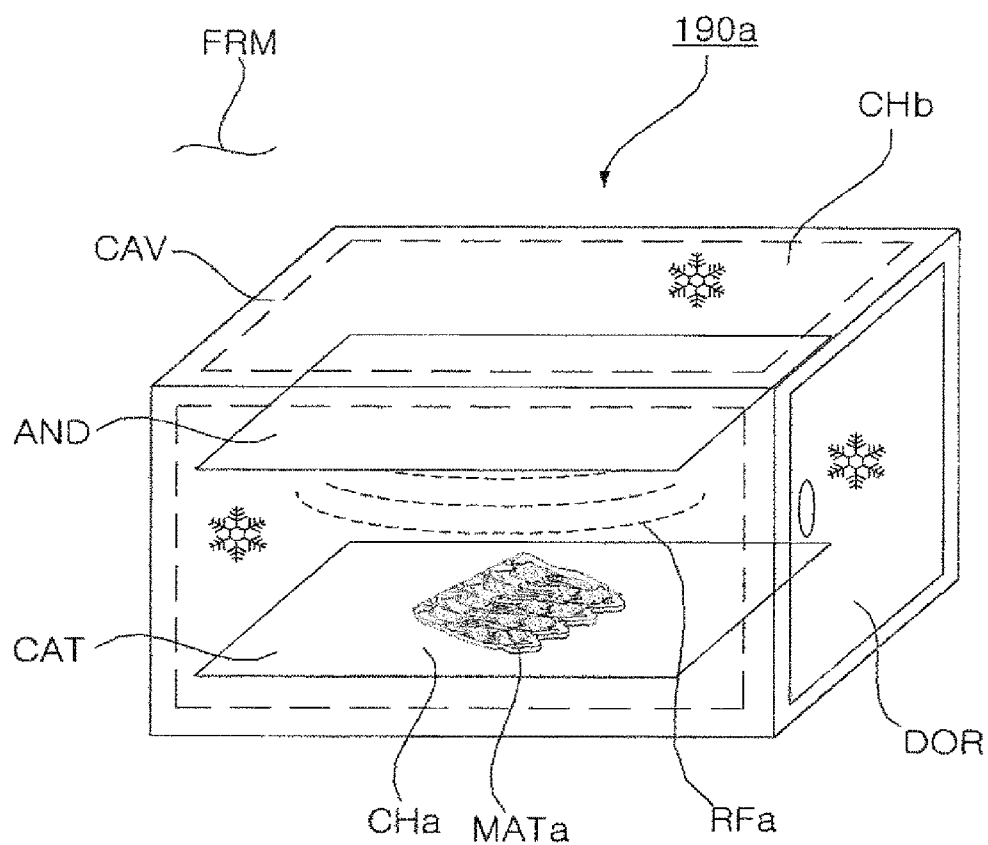

[Figure 8e]
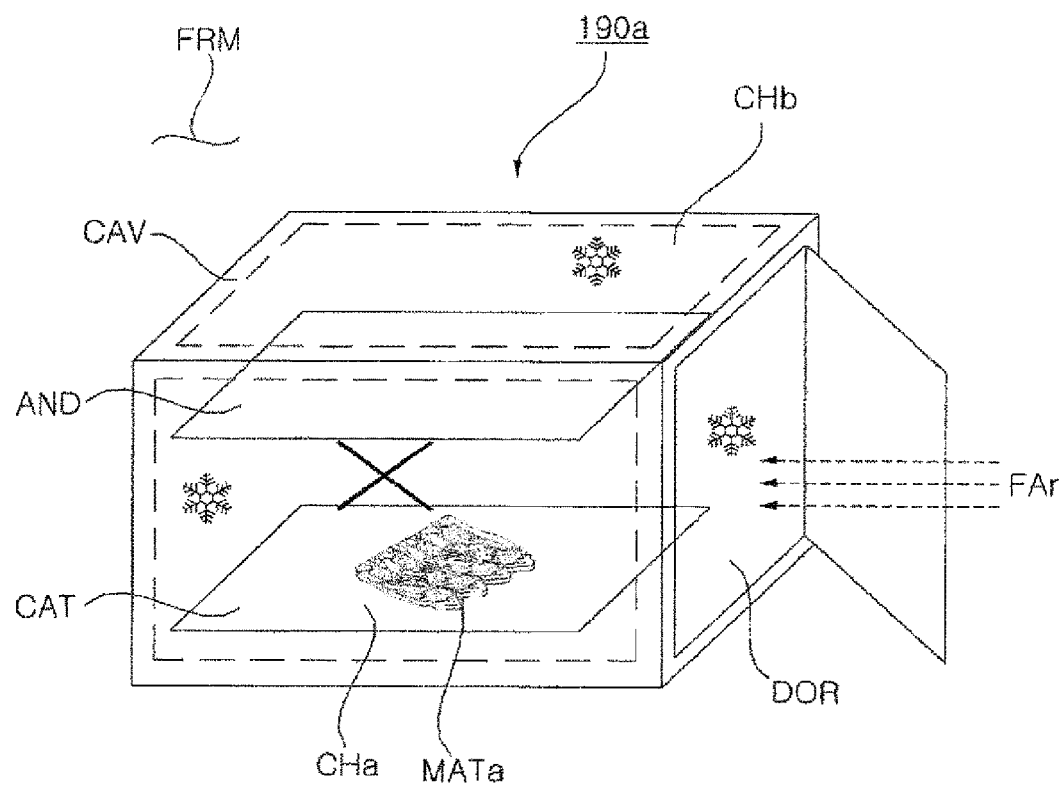

[Figure 9a]
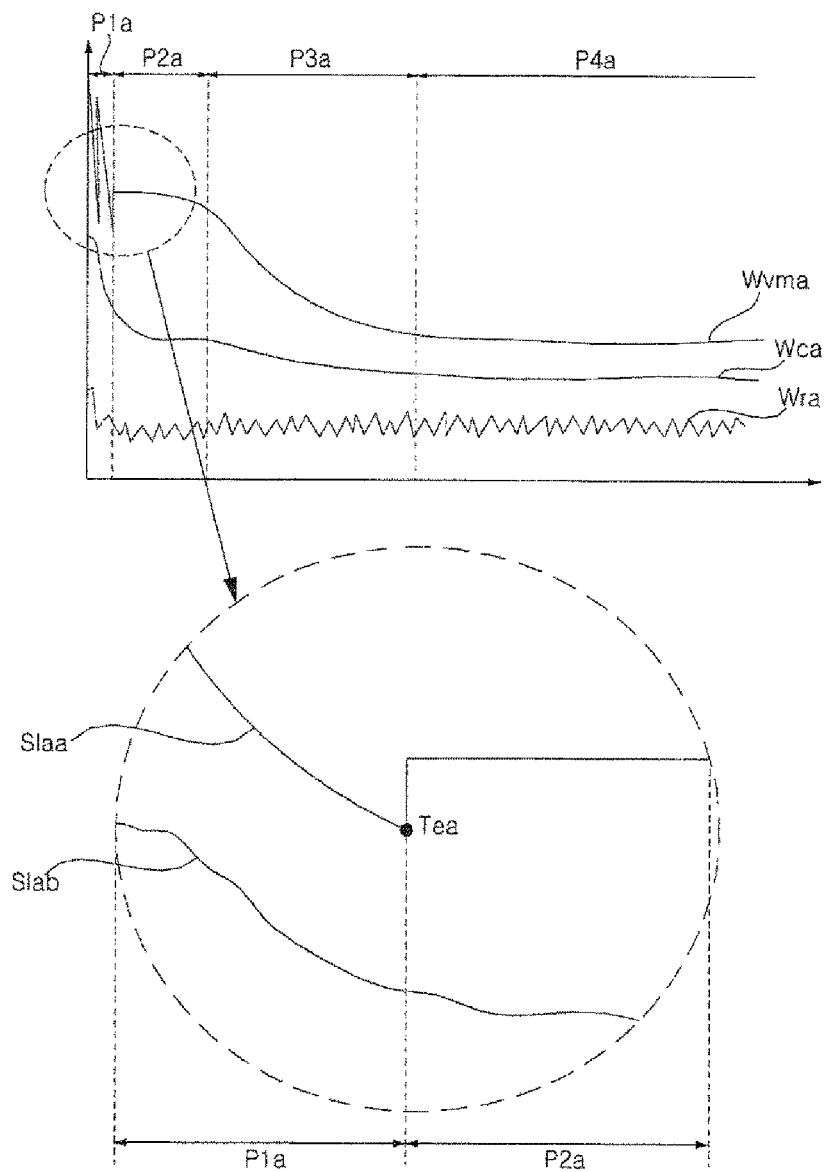

[Figure 9b]
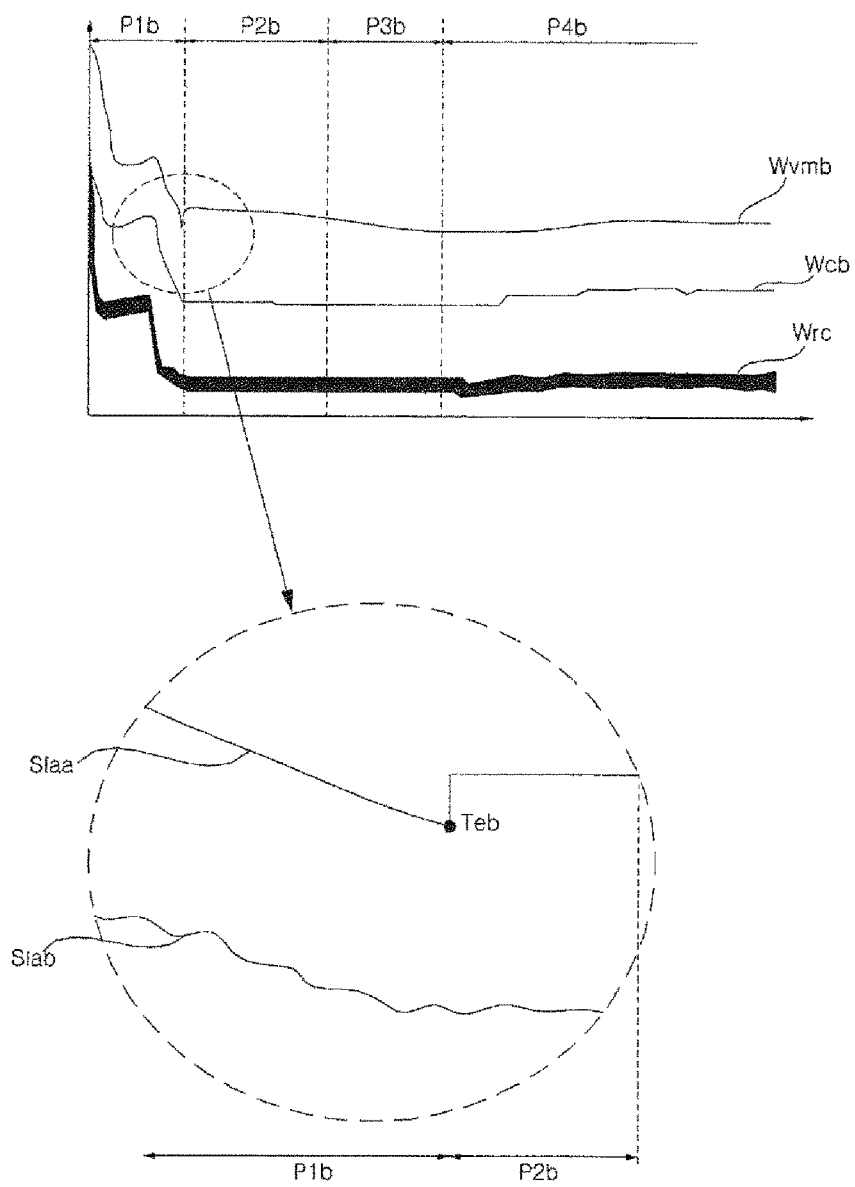

[Figure 10]
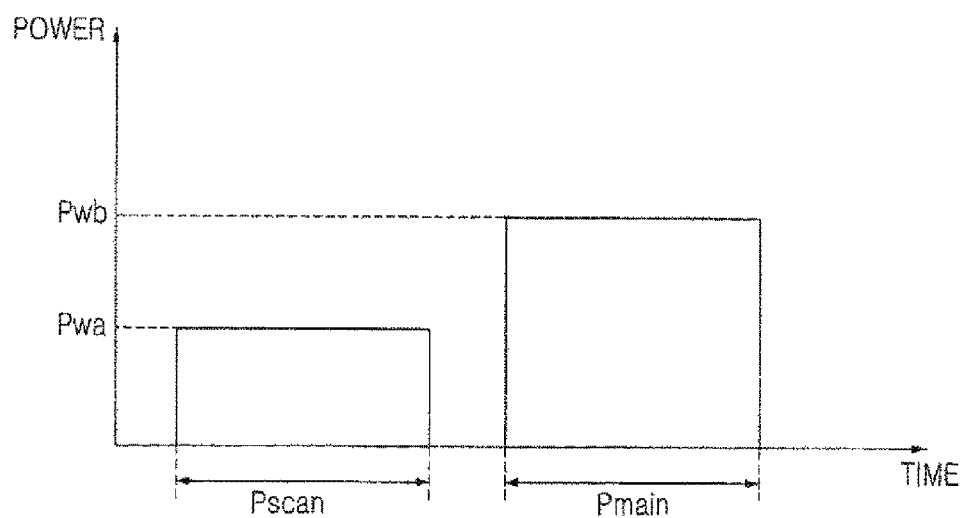
[Figure 11]
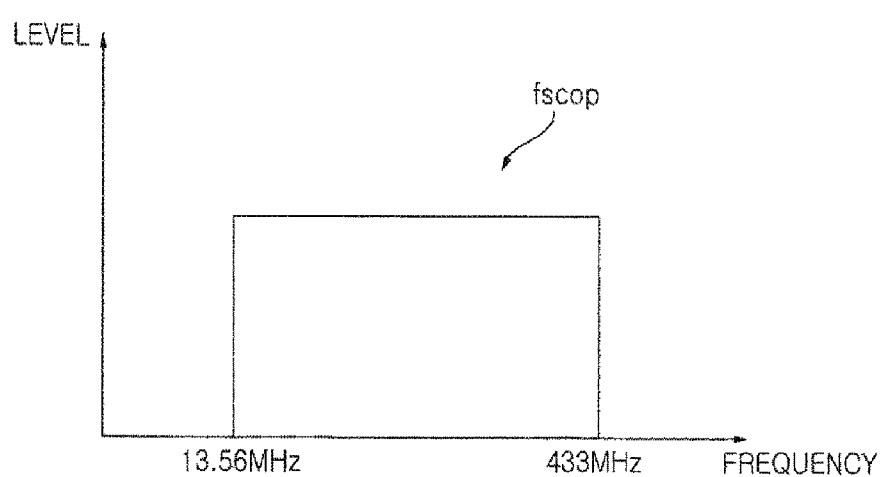

[Figure 12]
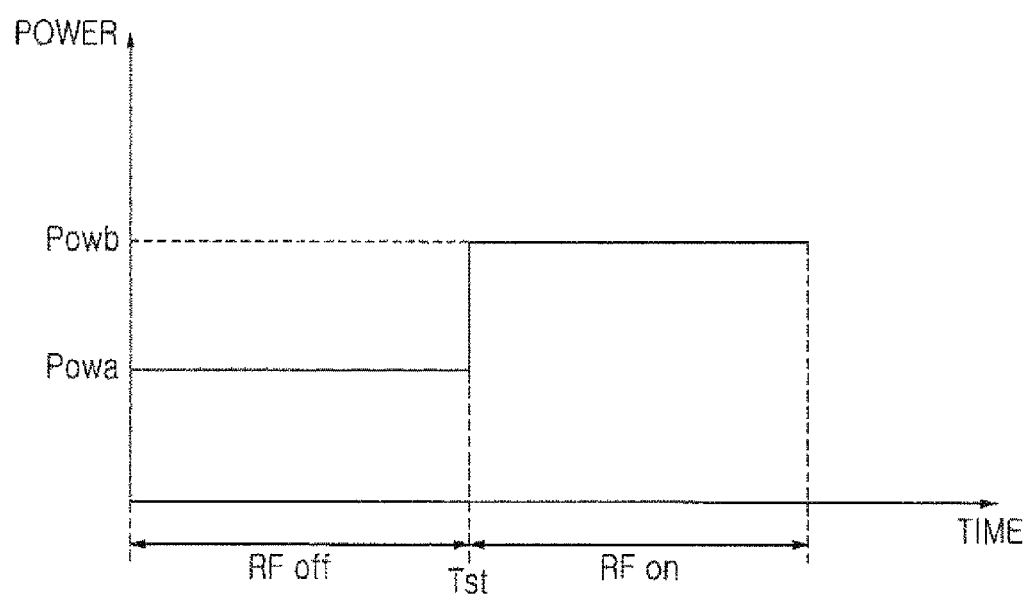

[Figure 13]
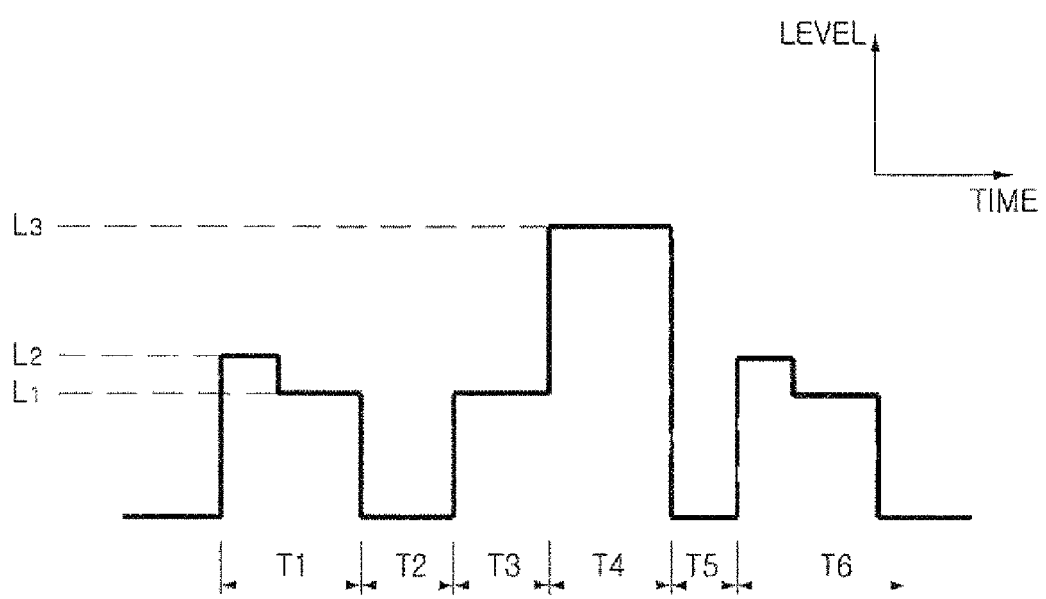

【Figure 14】
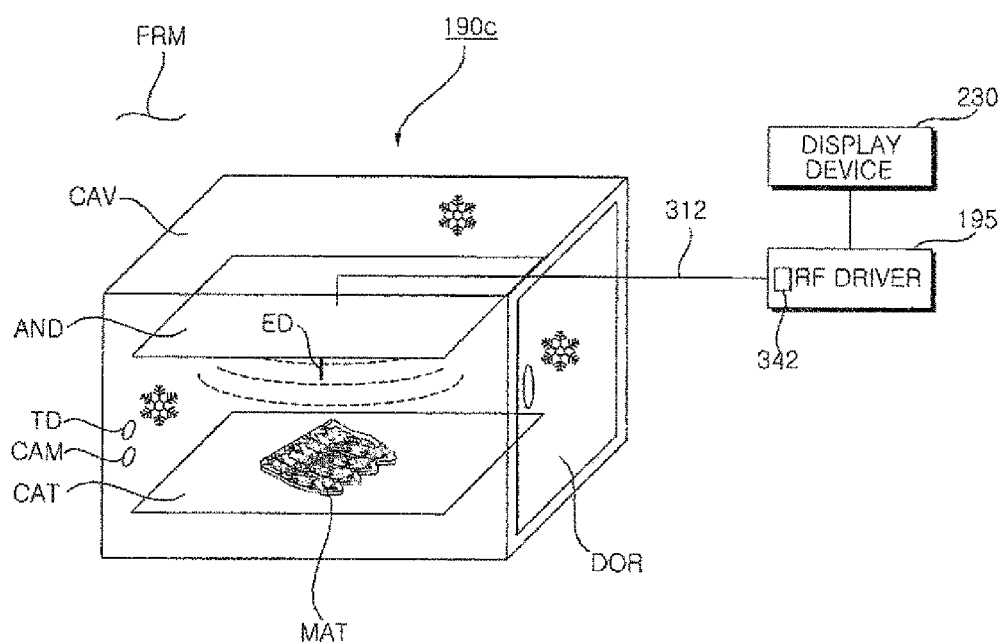

[Figure 15]
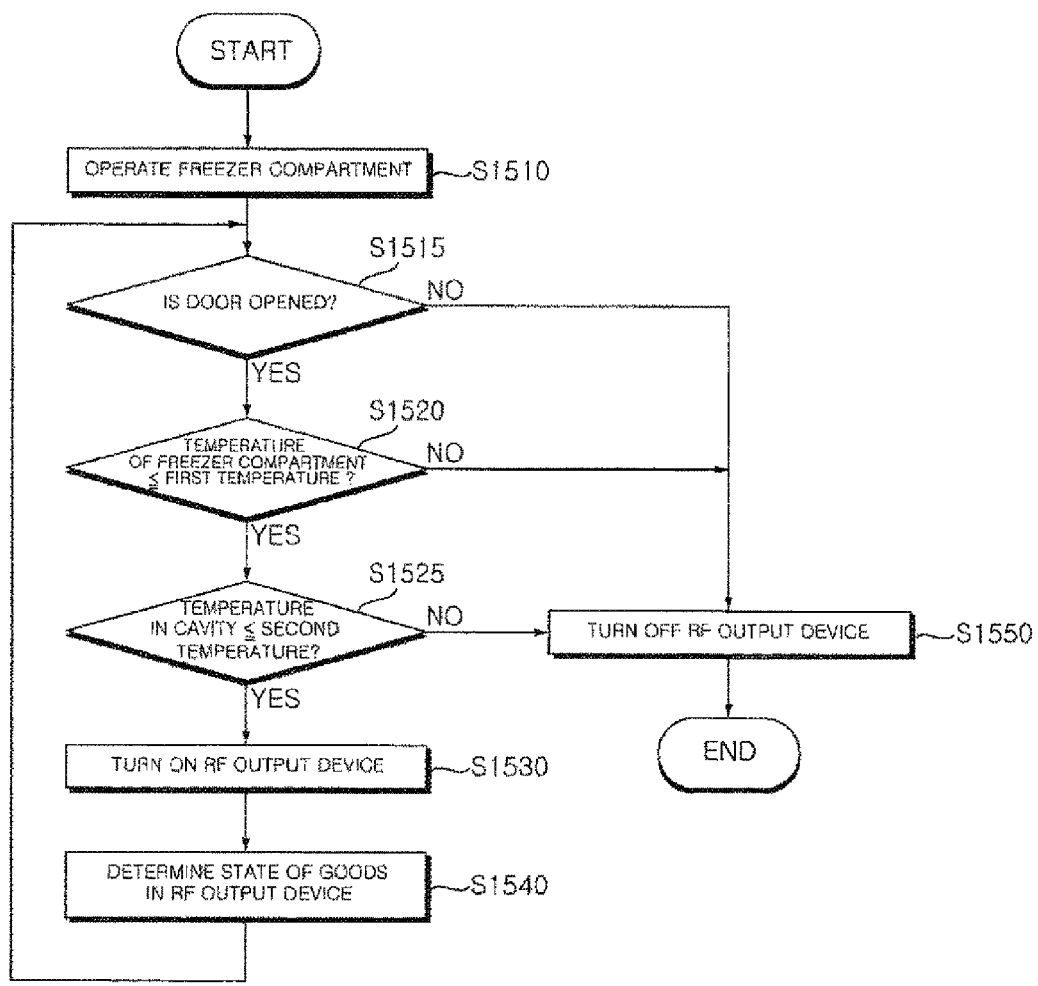

REFRIGERATOR

This application is a National Stage Application of International Application No. PCT/KR2019/017188, filed on Dec. 6, 2019, which claims priority to Korean Patent Application No. 10-2018-0155645, filed on Dec. 6, 2018, which are hereby incorporated by reference in their entirety for all purposes as if fully set forth herein.

TECHNICAL FIELD

The present invention relates to a refrigerator, and more particularly, to a refrigerator for maintaining the freshness of goods in the refrigerator by using a RF signal.

BACKGROUND ART

For long term storage of meat, fish, and the like, a freezer compartment in a refrigerator maintains a temperature of approximately −18° C.

Meanwhile, when cooking meat, fish, etc. frozen at a temperature of approximately −18° C., separate thawing is required. Accordingly, after the frozen meat, fish, etc. are taken out, and the thawing operation is performed through a separate cooking utensil. However, there is an inconvenience in that a separate thawing operation is performed through another utensil.

Korean Patent Publication No. 10-2008-0003218 discloses a supercooling apparatus including a non-freezer compartment for storing food in a non-freezing supercooling state and an electrode for applying an electric field to the non-freezer compartment.

However, such a supercooling apparatus performs an operation as a heater when a current is applied, which increases the internal temperature to increase the temperature of the load that was maintained at a low temperature. On the other hand, when the current is not applied, the internal temperature decreases to a low temperature again. Thus, there is a problem in that the food storage period is not long because the temperature change is repeated.

In addition, a temperature rise occurs only around the heater due to the operation of the heater. Accordingly, there is a problem in that even temperature change does not occur in the load.

In addition, thawing of frozen meat, fish, etc. cannot be performed.

DISCLOSURE

Technical Problem

The present invention has been made in view of the above problems, and provides a refrigerator for maintaining the freshness of the goods in the refrigerator by using a RF signal.

The present invention further provides a refrigerator for freezing the goods while maintaining the freshness of the goods in the refrigerator by using a RF signal.

Technical Solution

In accordance with an aspect of the present invention, a refrigerator includes: a fan to operate for supplying cold air to a cooling chamber; an RF output device disposed in the cooling chamber, and for outputting an RF signal into a cavity in the cooling chamber; and a controller for controlling the RF output device, wherein the controller is configured to output the RF signal to goods in the cavity, and to operate in a first section in which temperature of the goods falls, and a second section in which the temperature of the increases after the first section and maintains, wherein when the RF output device operates, a temperature of the cavity is higher than a temperature of other area in the cooling chamber.

Meanwhile, the controller of an aspect of the present invention controls to increase period of the first section, to delay a start time of the second section, or to increase period of the second section, as power of the RF signal output from the RF output device increases.

Meanwhile, the controller of an aspect of the present invention outputs the RF signal to the goods in the cavity, and to further perform a third section in which the temperature of the goods falls after the second section.

Meanwhile, a freezing temperature of the goods in the third section increases, as power of the RF signal output from the RF output device increases.

Meanwhile, in operation of the RF output device, the cool air in the cooling chamber may be supplied into the cavity.

Meanwhile, when the RF output device is turned off, the cool air in the cooling chamber is supplied into the cavity, and when the RF output device is operated, the cool air in the cooling chamber may be supplied into the cavity.

Meanwhile, when the RF output device is operated, the power consumption consumed in the compressor may increase than before the operation of the RF output device.

Meanwhile, in the operation of the RF output device, the temperature of the cooling chamber may increase than before the operation of the RF output device.

A heat insulating material may be attached to at least a portion of an inner surface or an outer surface of the cavity.

Meanwhile, when an operation signal for the operation of the RF output device is input while the goods is located in the cavity, the RF output device may output the RF signal in the direction of the foods.

Meanwhile, the controller of an aspect of the present invention is configured to change at least one of an output period and an output power of the RF signal based on a type of the goods or an input signal.

Meanwhile, when the goods is located in the cavity, the temperature of the goods decreases based on the cold air supplied into the cooling chamber and then maintained within a predetermined temperature range based on the RF signal from the RF output device.

Meanwhile, it is preferable that the temperature in the second section is higher than the lowest temperature at the time of the falling of the goods in the first section.

Meanwhile, the controller of an aspect of the present invention is configured to output the RF signal from the RF output device before a lowest temperature point in the first section.

Meanwhile, after turning on the refrigerator, the temperature of the cavity can continue to drop until the temperature of the goods maintains within a predetermined temperature range.

Meanwhile, a falling slope or a lowest temperature at a time when the temperature of goods in the first section falls is changed based on power of the RF signal from the RF output device.

Meanwhile, as the power of the RF signal becomes greater, the magnitude of the falling slope of the goods temperature becomes less, and the lowest temperature becomes greater.

Meanwhile, the controller of an aspect of the present invention can control to output the RF signal from the RF output device, from when the temperature of the goods falls.

Meanwhile, the controller of an aspect of the present invention turns off the RF output device, when a maintaining period within the predetermined temperature range of the goods is equal to or greater than an allowable period, and to output cool air supplied into the cooling chamber into the cavity.

Meanwhile, the controller of an aspect of the present invention is configured to output the RF signal into the cavity in response to an operation input signal for the RF output device in a state where the goods is frozen, wherein a power of the RF signal output when the goods is frozen is greater than a power of the RF signal output before the goods is frozen.

Meanwhile, the frequency of the RF signal is preferably 13.56 MHz to 433 MHz.

Meanwhile, the controller of an aspect of the present invention is configured to output a RF signal of a first power during a scan section, determine a type of the goods based on a reflected RF signal during the scan section, and output an RF signal of a second power set based on the determined type of the goods after end of the scan section.

Meanwhile, among a cooling section, an idle section, a pre-defrost cooling section, a defrost section, a post-defrost idle section, a post-defrost cooling section, the controller of an aspect of the present invention controls an output of the RF signal in the cooling section, the pre-defrost cooling section, or the post-defrost cooling section to be larger than an output in the idle section, the defrost section, or the post-defrost idle section.

Meanwhile, the controller of an aspect of the present invention controls the output of the RF signal to decrease or stop during a defrost section or a door load response operation, and controls the output of the RF signal to increase after termination of the defrost section or the load response operation when a door is opened.

Meanwhile, the controller of an aspect of the present invention outputs the RF signal, decrease a power of the RF signal when a defrost section is performed, and increase the power of the RF signal when the defrost section is terminated.

Meanwhile, the controller of an aspect of the present invention controls to stop the output of the RF signal in operation, when a door of the cooling chamber or the cavity is opened.

Meanwhile, the controller of an aspect of the present invention controls to output the RF signal, when the temperature of the cooling chamber is lower than or equal to a first temperature, and the temperature of the cavity is lower than or equal to a second temperature higher than the first temperature, in a state where a door of the cooling chamber or the cavity is closed.

Meanwhile, the controller of an aspect of the present invention determines the state of the goods in the cavity when the RF signal is output, and may change the power of the RF signal, or continue to output or stop the RF signal based on the state of the foods.

Meanwhile, the controller of an aspect of the present invention may control to stop the output of the RF signal, when the temperature of the cooling chamber is greater than the first temperature, or the temperature in the cavity is greater than the second temperature.

Meanwhile, the RF output device of an aspect of the present invention comprises a first plate and a second plate disposed in the cavity, wherein the RF output device further comprises at least one of: a signal detector for detecting an RF signal reflected from the goods in the cavity; a temperature detector for detecting a temperature in the cavity; and a camera for photographing the goods in the cavity.

Meanwhile, the controller of an aspect of the present invention determines whether the goods exists in the cavity based on a signal from at least one of the signal detector, the temperature detector, and the camera, and controls to output the RF signal, in a state where it is determined that the goods is positioned in the cavity, when the temperature of the cooling chamber is equal to or lower than the first temperature and the temperature in the cavity is equal to or lower than the second temperature higher than the first temperature.

In accordance with another aspect of the present invention, a refrigerator includes: a fan to operate for supplying cold air generated by the heat exchange in the evaporator to a cooling chamber; an RF output device disposed in the cooling chamber, and for outputting an RF signal into a cavity; and a controller for controlling the RF output device, wherein the controller controls to output the RF signal, in a state where the cooling chamber or a door of the cavity is closed, when a temperature of the cooling chamber is lower than or equal to a first temperature, and the temperature in the cavity is lower than or equal to a second temperature higher than the first temperature.

Meanwhile, the controller determines whether goods exists in the cavity based on an input signal, determines whether goods exists in the cavity based on a signal from at least one of a signal detector, a temperature detector, and a camera, and controls to output the RF signal, in a state where it is determined that the goods is positioned in the cavity, when the temperature of the cooling chamber is equal to or lower than the first temperature, and the temperature in the cavity is lower than or equal to the second temperature higher than the first temperature.

Advantageous Effects

Meanwhile, the refrigerator in accordance with an aspect of the present invention includes: a fan to operate for supplying cold air to a cooling chamber; an RF output device disposed in the cooling chamber, and for outputting an RF signal into a cavity in the cooling chamber; and a controller for controlling the RF output device, wherein the controller is configured to output the RF signal to goods in the cavity, and to operate in a first section in which temperature of the goods falls, and a second section in which the temperature of the increases after the first section and maintains, wherein when the RF output device operates, a temperature of the cavity is higher than a temperature of other area in the cooling chamber. Accordingly, the freshness of the goods in the refrigerator can be maintained by using the RF signal. In particular, since the water molecule movement in the goods by the RF signal becomes active, it is possible to freeze the goods while maintaining the freshness of the foods.

Meanwhile, the controller of an aspect of the present invention controls to increase period of the first section, to delay a start time of the second section, or to increase period of the second section, as power of the RF signal output from the RF output device increases. Accordingly, the freshness of the goods in the refrigerator can be maintained by using the RF signal.

Meanwhile, the controller of an aspect of the present invention outputs the RF signal to the goods in the cavity, and to further perform a third section in which the temperature of the goods falls after the second section. Accordingly, the freshness of the goods in the refrigerator can be maintained by using the RF signal.

Meanwhile, a freezing temperature of the goods in the third section increases, as power of the RF signal output from the RF output device increases. Accordingly, the freshness of the goods in the refrigerator can be maintained by using the RF signal. In particular, it is possible to freeze the goods while maintaining the freshness of the foods.

Meanwhile, in operation of the RF output device, the cool air in the cooling chamber may be supplied into the cavity. Accordingly, it is possible to freeze the goods while maintaining the freshness of the goods by using the RF signal.

Meanwhile, when the RF output device is turned off, the cool air in the cooling chamber is supplied into the cavity, and when the RF output device is operated, the cool air in the cooling chamber may be supplied into the cavity. Accordingly, it is possible to freeze the goods without supplying the RF signal.

Meanwhile, when the RF output device is operated, the power consumption consumed in the compressor may increase than before the operation of the RF output device. Accordingly, it is possible to freeze the goods while maintaining the freshness of the goods by using the RF signal.

Meanwhile, in the operation of the RF output device, the temperature of the cooling chamber may increase than before the operation of the RF output device. Accordingly, it is possible to freeze the goods while maintaining the freshness of the goods by using the RF signal.

A heat insulating material may be attached to at least a portion of an inner surface or an outer surface of the cavity. Accordingly, the inside of the cavity is insulated from the cooling chamber, so that the freshness of the goods in the refrigerator can be maintained by using the RF signal output into the cavity.

Meanwhile, when an operation signal for the operation of the RF output device is input while the goods is located in the cavity, the RF output device may output the RF signal in the direction of the foods. Accordingly, it is possible to freeze the goods in the refrigerator by using the RF signal.

Meanwhile, the controller of an aspect of the present invention is configured to change at least one of an output period and an output power of the RF signal based on a type of the goods or an input signal. Accordingly, the freshness of the goods can be properly maintained based on the type of the foods.

Meanwhile, when the goods is located in the cavity, the temperature of the goods decreases based on the cold air supplied into the cooling chamber and then maintained within a predetermined temperature range based on the RF signal from the RF output device. Accordingly, it is possible to freeze the goods while maintaining the freshness of the goods by using the RF signal.

Meanwhile, it is preferable that the temperature in the second section is higher than the lowest temperature at the time of the falling of the goods in the first section. Accordingly, it is possible to freeze the goods while maintaining the freshness of the goods by using the RF signal.

Meanwhile, the controller of an aspect of the present invention is configured to output the RF signal from the RF output device before a lowest temperature point in the first section. Accordingly, it is possible to freeze the goods while maintaining the freshness of the goods by using the RF signal.

Meanwhile, after turning on the refrigerator, the temperature of the cavity can continue to drop until the temperature of the goods maintains within a predetermined temperature range. Accordingly, it is possible to freeze the goods while maintaining the freshness of the goods by using the RF signal.

Meanwhile, a falling slope or a lowest temperature at a time when the temperature of goods in the first section falls is changed based on power of the RF signal from the RF output device. Accordingly, it is possible to freeze the goods while maintaining the freshness of the goods by using the RF signal.

Meanwhile, as the power of the RF signal becomes greater, the magnitude of the falling slope of the goods temperature decreases, and the lowest temperature becomes greater. Accordingly, it is possible to freeze the goods while maintaining the freshness of the goods by using the RF signal.

Meanwhile, the controller of an aspect of the present invention can control to output the RF signal from the RF output device, from when the temperature of the goods falls. Accordingly, it is possible to freeze the goods while maintaining the freshness of the goods by using the RF signal.

Meanwhile, the controller of an aspect of the present invention turns off the RF output device, when a maintaining period within the predetermined temperature range of the goods is equal to or greater than an allowable period, and to output cool air supplied into the cooling chamber into the cavity. Accordingly, it is possible to freeze the goods while maintaining the freshness of the goods by using the RF signal.

Meanwhile, the controller of an aspect of the present invention is configured to output the RF signal into the cavity in response to an operation input signal for the RF output device in a state where the goods is frozen, wherein a power of the RF signal output when the goods is frozen is greater than a power of the RF signal output before the goods is frozen. Accordingly, it is possible to freeze the goods while maintaining the freshness of the goods by using the RF signal.

Meanwhile, the frequency of the RF signal is preferably 13.56 MHz to 433 MHz. Accordingly, the movement of water molecules in the goods by the RF signal becomes active, and the goods can be frozen while maintaining the freshness of the foods.

Meanwhile, the controller of an aspect of the present invention is configured to output a RF signal of a first power during a scan section, determine a type of the goods based on a reflected RF signal during the scan section, and output an RF signal of a second power set based on the determined type of the goods after end of the scan section. Accordingly, it is possible to freeze the goods while efficiently maintaining the freshness of the goods by using the RF signal.

Meanwhile, among a cooling section, an idle section, a pre-defrost cooling section, a defrost section, a post-defrost idle section, a post-defrost cooling section, the controller of an aspect of the present invention controls an output of the RF signal in the cooling section, the pre-defrost cooling section, or the post-defrost cooling section to be larger than an output in the idle section, the defrost section, or the post-defrost idle section. Accordingly, it is possible to freeze the goods while maintaining the freshness of the goods by using the RF signal.

Meanwhile, the controller of an aspect of the present invention controls the output of the RF signal to decrease or stop during a defrost section or a door load response operation, and controls the output of the RF signal to increase after termination of the defrost section or the load response operation when a door is opened. Accordingly, it is possible to freeze the goods while maintaining the freshness of the goods by using the RF signal.

Meanwhile, the controller of an aspect of the present invention outputs the RF signal, decrease a power of the RF signal when a defrost section is performed, and increase the power of the RF signal when the defrost section is terminated. Accordingly, it is possible to freeze the goods while maintaining the freshness of the goods by using the RF signal.

Meanwhile, the controller of an aspect of the present invention controls to stop the output of the RF signal in operation, when a door of the cooling chamber or the cavity is opened. Accordingly, power consumption can be reduced.

Meanwhile, the controller of an aspect of the present invention controls to output the RF signal, when the temperature of the cooling chamber is lower than or equal to a first temperature, and the temperature of the cavity is lower than or equal to a second temperature higher than the first temperature, in a state where a door of the cooling chamber or the cavity is closed. Accordingly, it is possible to freeze the goods while maintaining the freshness of the goods by using the RF signal.

Meanwhile, the controller of an aspect of the present invention determines the state of the goods in the cavity when the RF signal is output, and may change the power of the RF signal, or continue to output or stop the RF signal based on the state of the foods. Accordingly, it is possible to freeze the goods while maintaining the freshness of the goods by using the RF signal.

Meanwhile, the controller of an aspect of the present invention may control to stop the output of the RF signal, when the temperature of the cooling chamber is greater than the first temperature, or the temperature in the cavity is greater than the second temperature. Accordingly, it is possible to freeze the goods while maintaining the freshness of the goods by using the RF signal.

Meanwhile, the RF output device of an aspect of the present invention comprises a first plate and a second plate disposed in the cavity, wherein the RF output device further comprises at least one of: a signal detector for detecting an RF signal reflected from the goods in the cavity; a temperature detector for detecting a temperature in the cavity; and a camera for photographing the goods in the cavity. Accordingly, through the feedback for the RF signal output, the goods can be frozen while efficiently maintaining the freshness of the goods in the refrigerator.

Meanwhile, the controller of an aspect of the present invention determines whether the goods exists in the cavity based on a signal from at least one of the signal detector, the temperature detector, and the camera, and controls to output the RF signal, in a state where it is determined that the goods is positioned in the cavity, when the temperature of the cooling chamber is equal to or lower than the first temperature and the temperature in the cavity is equal to or lower than the second temperature higher than the first temperature. Accordingly, it is possible to freeze the goods while maintaining the freshness of the goods by using the RF signal.

The refrigerator in accordance with another aspect of the present invention includes: a fan to operate for supplying cold air generated by the heat exchange in the evaporator to a cooling chamber; an RF output device disposed in the cooling chamber, and for outputting an RF signal into a cavity; and a controller for controlling the RF output device, wherein the controller controls to output the RF signal, in a state where the cooling chamber or a door of the cavity is closed, when a temperature of the cooling chamber is lower than or equal to a first temperature, and the temperature in the cavity is lower than or equal to a second temperature higher than the first temperature. Accordingly, it is possible to freeze the goods while maintaining the freshness of the goods by using the RF signal.

Meanwhile, the controller determines whether goods exists in the cavity based on an input signal, determines whether goods exists in the cavity based on a signal from at least one of a signal detector, a temperature detector, and a camera, and controls to output the RF signal, in a state where it is determined that the goods is positioned in the cavity, when the temperature of the cooling chamber is equal to or lower than the first temperature, and the temperature in the cavity is lower than or equal to the second temperature higher than the first temperature. Accordingly, it is possible to freeze the goods while maintaining the freshness of the goods by using the RF signal.

DESCRIPTION OF DRAWINGS

The above and other objects, features and advantages of the present invention will be more apparent from the following detailed description in conjunction with the accompanying drawings, in which:

FIG. 1 is a perspective view illustrating a refrigerator according to an embodiment of the present invention;

FIG. 2 is a perspective view of a door of the refrigerator of FIG. 1;

FIG. 3 is a view schematically illustrating a configuration of the refrigerator of FIG. 1;

FIG. 4 is a block diagram schematically illustrating the inside of the refrigerator shown in FIG. 1;

FIG. 5A illustrates an RF output device according to an embodiment of the present invention;

FIG. 5B is a diagram illustrating an RF output device according to another embodiment of the present invention;

FIG. 6 is a block diagram illustrating the inside of a RF driver of FIG. 4;

FIG. 7 is a flowchart illustrating an operating method of a refrigerator according to an embodiment of the present invention;

FIGS. 8 to 13 are diagrams for explaining the operating method of FIG. 7;

FIG. 14 is a diagram illustrating an RF output device according to another embodiment of the present invention; and FIG. 15 is a flowchart illustrating an operating method of a refrigerator according to another embodiment of the present invention.

BEST MODE

Exemplary embodiments of the present invention are described with reference to the accompanying drawings in detail. The suffixes "module" and "unit" in elements used in description below are given only in consideration of ease in preparation of the specification and do not have specific meanings or functions. Therefore, the suffixes "module" and "unit" may be used interchangeably.

FIG. 1 is a perspective view illustrating a refrigerator according to an embodiment of the present invention.

Referring to the drawings, a refrigerator 100 according to an embodiment of the present invention forms a rough outer shape by a case 110 having an internal space divided, although not shown, into a freezer compartment and a refrigerating compartment, a freezer compartment door 120 that shields the freezer compartment, and a refrigerator door 140 to shield the refrigerating compartment.

In addition, the front surface of the freezer compartment door 120 and the refrigerating compartment door 140 is further provided with a door handle 121 protruding forward, so that a user easily grips and rotates the freezer compartment door 120 and the refrigerating compartment door 140.

Meanwhile, the front surface of the refrigerating compartment door 140 may be further provided with a home bar 180 which is a convenient means for allowing a user to take out a storage such as a beverage contained therein without opening the refrigerating compartment door 140.

In addition, the front surface of the freezer compartment door 120 may be provided with a dispenser 160 which is a convenient means for allowing the user to easily take out ice or drinking water without opening the freezer compartment door 120, and a control panel 210 for controlling the driving operation of the refrigerator 100 and displaying the state of the refrigerator 100 being operated on a screen may be further provided in an upper side of the dispenser 160.

Meanwhile, in the drawing, it is illustrated that the dispenser 160 is disposed in the front surface of the freezer compartment door 120, but is not limited thereto, and may be disposed in the front surface of the refrigerating compartment door 140.

Meanwhile, an RF output device 190 for freezing the goods by using cold air in the freezer compartment while maintaining the freshness may be disposed in the inner upper portion of the freezer compartment (not shown). Meanwhile, unlike the drawing, the RF output device 190 may be disposed in the refrigerating compartment. The RF output device 190 will be described later with reference to FIG. 5A and below.

The control panel 210 may include an input device 220 formed of a plurality of buttons, and a display device 230 for displaying a control screen, an operation state, and the like.

The display device 230 displays information such as a control screen, an operation state, a temperature inside the refrigerator, and the like. For example, the display device 230 may display the set temperature of the freezer compartment and the set temperature of the refrigerating compartment.

The display device 230 may be implemented in various ways, such as a liquid crystal display (LCD), a light emitting diode (LED), an organic light emitting diode (OLED), and the like. In addition, the display device 230 may be implemented as a touch screen capable of serving as the input device 220.

The input device 220 may include a plurality of operation buttons. For example, the input device 220 may include a freezer compartment temperature setting button (not shown) for setting the freezer compartment temperature, and a refrigerating compartment temperature setting button (not shown) for setting the refrigerating compartment temperature. Meanwhile, the input device 220 may be implemented of a touch screen that can also serve as the display device 230.

Meanwhile, the refrigerator based on the embodiment of the present invention is not limited to a double door type shown in the drawing, but may be a one door type, a sliding door type, a curtain door type, and the like regardless of its form. Furthermore, as described later, it is sufficient that the RF output device 190 for outputting an RF signal is disposed inside the freezer compartment.

FIG. 2 is a perspective view of a door of the refrigerator of FIG. 1.

Referring to the drawing, a freezer compartment 155 is disposed inside the freezer compartment door 120, and a refrigerating compartment 157 is disposed inside the refrigerating compartment door 140.

An RF output device 190 may be disposed in the inner upper portion of the freezer compartment 155 to freeze the goods by using cold air in the freezer compartment while maintaining the freshness.

In the drawing, it is shown that the RF output device 190 is attached to the freezer compartment door 120, but the present invention is not limited thereto, and it is also possible that the RF output device 190 is disposed in a space inside the freezer compartment instead of the freezer compartment door 120.

FIG. 3 is a view schematically illustrating a configuration of the refrigerator of FIG. 1.

Referring to the drawings, the refrigerator 100 may include a compressor 112, a condenser 116 for condensing a refrigerant compressed by the compressor 112, a freezer compartment evaporator 122 which is supplied with the refrigerant condensed in the condenser 116 to evaporate, and is disposed in a freezer compartment (not shown), and a freezer compartment expansion valve 132 for expanding the refrigerant supplied to the freezer compartment evaporator 122.

Meanwhile, in the drawing, it illustrated that a single evaporator is used, but it is also possible to use respective evaporators may be used in the refrigerating compartment and the freezer compartment.

That is, the refrigerator 100 may further include a refrigerating compartment evaporator (not shown) disposed in a refrigerator compartment (not shown), a three-way valve (not shown) for supplying the refrigerant condensed in the condenser 116 to the refrigerating compartment evaporator (not shown) or the freezer compartment evaporator 122, and a refrigerating compartment expansion valve (not shown) for expanding the refrigerant supplied to the refrigerating compartment evaporator (not shown).

In addition, the refrigerator 100 may further include a gas-liquid separator (not shown) which separates the refrigerant passed through the evaporator 122 into a liquid and a gas.

In addition, the refrigerator 100 may further include a refrigerating compartment fan (not shown) and a freezer compartment fan 144 that suck cold air that passed through the freezer compartment evaporator 122 and blow the sucked cold air into a refrigerating compartment (not shown) and a freezer compartment (not shown) respectively.

In addition, the refrigerator 100 may further include a compressor driver 113 for driving the compressor 112, and a refrigerating compartment fan driver (not shown) and a freezer compartment fan driver 145 for driving the refrigerating compartment fan (not shown) and the freezer compartment 144.

Meanwhile, based on the drawing, since a common evaporator 122 is used for the refrigerating compartment and the freezer compartment, in this case, a damper (not shown) may be installed between the refrigerating compartment and the freezer compartment, and a fan (not shown) may forcibly blow the cold air generated in one evaporator to be supplied to the freezer compartment and the refrigerating compartment.

FIG. 4 is a block diagram schematically illustrating the inside of the refrigerator shown in FIG. 1.

Referring to the drawing, the refrigerator of FIG. 4 includes a compressor 112, a machine room fan 115, a freezer compartment fan 144, a main controller 310, a heater 330, an RF output device 190, an ice bank 195, a temperature detector 320, and a memory 240. In addition, the refrigerator may further include a compressor driver 113, a machine room fan driver 117, a freezer compartment fan driver 145, a heater driver 332, an RF driver 195, an RF output device 190, a display device 230, and an input device 220.

The compressor 112, the machine room fan 115, and the freezer compartment fan 144 are described with reference to FIG. 2.

The input device 220 includes a plurality of operation buttons, and transmits a signal for an input freezer compartment set temperature or refrigerating compartment set temperature to the main controller 310.

The display device 230 may display an operation state of the refrigerator. Meanwhile, the display device 230 is operable under the control of a display controller (not shown).

The memory 240 may store data necessary for operating the refrigerator.

For example, the memory 240 may store power consumption information for each of the plurality of power consumption units. In addition, the memory 240 may output corresponding power consumption information to the main controller 310 based on the operation of each power consumption unit in the refrigerator.

The temperature detector 320 detects a temperature in the refrigerator and transmits a signal for the detected temperature to the main controller 310. Here, the temperature detector 320 detects the refrigerating compartment temperature and the freezer compartment temperature respectively. In addition, the temperature of each chamber in the refrigerating compartment or each chamber in the freezer compartment may be detected.

As shown in the drawing, in order to control the on/off operation of the compressor 112, the fan 115 or 144, and the RF output device 190, the main controller 310 may control the compressor driver 113, the fan driver 117 or 145, and the RF driver 195 to finally control the compressor 112, the fan 115 or 144, and the RF output device 190. Here, the fan driver may be the machine room fan driver 117 or the freezer compartment fan driver 145.

For example, the main controller 310 may output a corresponding speed command value signal to the compressor driver 113 or the fan driver 117 or 145 respectively.

The compressor driver 113 and the freezer compartment fan driver 145 described above are provided with a compressor motor (not shown) and a freezer compartment fan motor (not shown) respectively, and each motor (not shown) may be operated at a target rotational speed under the control of the main controller 310.

Meanwhile, the machine room fan driver 117 includes a machine room fan motor (not shown), and the machine room fan motor (not shown) may be operated at a target rotational speed under the control of the main controller 310.

When such a motor is a three-phase motor, it may be controlled by a switching operation in an inverter (not shown) or may be controlled at a constant speed by using an AC power source intactly. Here, each motor (not shown) may be any one of an induction motor, a Blush less DC (BLDC) motor, a synchronous reluctance motor (synRM) motor, and the like.

Meanwhile, as described above, the main controller 310 may control the overall operation of the refrigerator 100, in addition to the operation control of the compressor 112 and the fan 115 or 144.

For example, as described above, the main controller 310 may control the overall operation of the refrigerant cycle based on the set temperature from the input device 220. For example, the main controller 310 may further control a three-way valve (not shown), a refrigerating compartment expansion valve (not shown), and a freezer compartment expansion valve 132, in addition to the compressor driver 113, the refrigerating compartment fan driver 143, and the freezer compartment fan driver 145. In addition, the operation of the condenser 116 may also be controlled. In addition, the main controller 310 may control the operation of the display device 230.

Meanwhile, the heater 330 may be a freezer compartment defrost heater. In order to remove frost attached to the freezer compartment evaporator 122, the freezer compartment defrost heater 330 may operate. To this end, the heater driver 332 may control the operation of the heater 330. Meanwhile, the main controller 310 may control the heater driver 332.

Meanwhile, the main controller 310 may output a driving signal to the RF driver 195 so as to control the RF output device 190.

Meanwhile, in order to control the RF output device 190, with respect to the goods MAT in a cavity CAV in the RF output device 190, the main controller 310 outputs an RF signal, and controls to operate in a first section P1a in which the temperature of the goods MAT falls, and a second section P2a in which the temperature of the goods MAT increases after the first section P1a and maintains within a predetermined temperature range. In addition, in the operation the RF output device 190, the main controller 310 may control the temperature of the cavity CAV to be higher than the temperature of other area in the cooling chamber FRM. Accordingly, the freshness of the goods MAT in the refrigerator 100 may be maintained by using the RF signal. In particular, the movement of water molecules in the goods MAT due to the RF signal becomes active, so that the goods MAT can be frozen while maintaining the freshness of the goods MAT.

FIG. 5A illustrates an RF output device according to an embodiment of the present invention.

Referring to the drawing, the RF output device 190a may include a first plate AND and a second plate CAT disposed inside or outside the cavity CAV.

The first plate AND and the second plate CAT may be spaced apart from each other, and may be disposed above and below the cavity CAV respectively, and the first plate AND may be electrically connected to an RF signal transmitter 312.

Meanwhile, when an electrical signal is applied to at least one of the first plate AND and the second plate CAT while the goods MAT is positioned in the second plate CAT or in the cavity CAV, the RF signal RFa may be output to the goods MAT inside the cavity CAV.

Meanwhile, unlike the drawing, the first plate AND and the second plate CAT may be disposed to be spaced apart from each other in the side surface of the cavity CAV.

In addition, in the drawing, it is illustrated that the door DOR is disposed in the side surface of the cavity CAV. The door DOR may be opened or closed by rotating or moving in one direction.

Meanwhile, it is preferable that the RF signal output from the RF output device 190a is output while the door DOR is closed. To this end, the RF output device 190a may further include a door open/close detection sensor that detects whether the door DOR is opened or closed.

Meanwhile, the RF signal transmitter 312 may be connected to the RF driver 195. The RF driver 195 may be controlled by the main controller 310. The RF driver 195 will be described later with reference to FIG. 6.

Meanwhile, with respect to the goods MAT in the cavity CAV, the main controller 310 outputs an RF signal so that a first section P1*a* in which the temperature of the goods MAT falls and a second section P2*a* in which the temperature of the goods MAT increases after the first section P1*a* and maintains within a predetermined temperature range can be divided and operated. In addition, in the operation the RF output device 190, the main controller 310 may control the temperature of the cavity CAV to be higher than the temperature of other area in the cooling chamber FRM. Accordingly, the freshness of the goods MAT in the refrigerator 100 may be maintained by using the RF signal. In particular, the movement of water molecules in the goods MAT due to the RF signal becomes active, so that the goods MAT can be frozen while maintaining the freshness of the goods MAT.

Meanwhile, as the power of the RF signal output from the RF output device 190 increases, the main controller 310 may control to increase the first section Pia, or to delay the start point of the second section P2*a* or increase the second section P2*a*. Accordingly, the freshness of the goods MAT in the refrigerator 100 may be maintained by using the RF signal.

Meanwhile, the main controller 310 outputs an RF signal to the goods MAT in the cavity CAV, and control so that a third section P3*a* in which the temperature of the goods MAT falls after the second section P2*a* can be further performed. Accordingly, the goods MAT can be frozen while maintaining the freshness of the goods MAT.

Meanwhile, as the power of the RF signal output from the RF output device 190 increases, the freezing temperature of the goods MAT in the third section P3*a* may increase. Accordingly, the freshness of the goods MAT in the refrigerator 100 may be maintained by using the RF signal. In particular, the goods MAT can be frozen while maintaining the freshness of the goods MAT.

Meanwhile, in the operation of the RF output device 190, the cold air FAr in the cooling chamber FRM may be supplied into the cavity CAV. Accordingly, the goods MAT may be frozen while maintaining the freshness of the goods MAT in the refrigerator 100 by using the RF signal.

Meanwhile, when the operation of the RF output device 190 is turned off, the cold air FAr in the cooling chamber FRM is supplied into the cavity CAV, and when the RF output device 190 is operated, the cold air FAr in the cooling chamber FRM may be supplied into the cavity CAV. Accordingly, it is possible to freeze the goods MAT without supplying the RF signal.

Meanwhile, when the RF output device 190 is operated, the power consumption consumed in the compressor 112 may increase than before the RF output device 190 is operated. Accordingly, the goods MAT may be frozen while maintaining the freshness of the goods MAT in the refrigerator 100 by using the RF signal.

Meanwhile, when the RF output device 190 is operated, the temperature of the cooling chamber FRM may increase than before the RF output device 190 is operated. Accordingly, the goods MAT may be frozen while maintaining the freshness of the goods MAT in the refrigerator 100 by using the RF signal.

Meanwhile, heat insulating material (Cha, CHb) may be attached to at least a portion of the inner surface or the outer surface of the cavity CAV. Accordingly, the inside of the cavity CAV is insulated from the cooling chamber FRM, so that the freshness of the goods MAT in the refrigerator 100 may be maintained by using the RF signal output into the cavity CAV.

Meanwhile, when the operation signal for the operation of the RF output device 190 is input in a state where the goods MAT is positioned in the cavity CAV, the RF output device 190 may output the RF signal in the direction of the goods MAT. Accordingly, the freshness of the goods MAT in the refrigerator 100 may be maintained by using the RF signal.

Meanwhile, the main controller 310 may control at least one of an output period and an output power of the RF signal to vary, based on the type of the goods MAT or the input signal. Accordingly, the freshness of the goods MAT can be appropriately maintained based on the type of the goods MAT.

Meanwhile, when the goods MAT is positioned in the cavity CAV, the temperature of the goods MAT falls based on the cold air FAr supplied into the cooling chamber FRM, and then maintains within a predetermined temperature range based on the RF signal from the RF output device 190. Accordingly, the goods MAT may be frozen while maintaining the freshness of the goods MAT in the refrigerator 100 by using the RF signal.

Meanwhile, it is preferable that the temperature in the second section P2*a* is higher than the lowest temperature at the time when the temperature of the goods MAT in the first section P1*a* falls. Accordingly, the goods MAT may be frozen while maintaining the freshness of the goods MAT in the refrigerator 100 by using the RF signal.

Meanwhile, the main controller 310 may control the RF signal from the RF output device 190 to be output before the time point of lowest temperature in the first section P1*a*. Accordingly, the goods MAT may be frozen while maintaining the freshness of the goods MAT in the refrigerator 100 by using the RF signal.

Meanwhile, after the refrigerator 100 is turned on, the temperature of the cavity CAV may continue to fall until the temperature of the goods MAT maintains within a predetermined temperature range. Accordingly, the goods MAT may be frozen while maintaining the freshness of the goods MAT in the refrigerator 100 by using the RF signal.

Meanwhile, the falling slope or the lowest temperature at the time when the temperature of goods MAT in the first section P1*a* falls may change based on the power of the RF signal from the RF output device 190. Accordingly, the goods MAT may be frozen while maintaining the freshness of the goods MAT in the refrigerator 100 by using the RF signal.

Meanwhile, as the power of the RF signal becomes larger, the magnitude of the MAT temperature fall slope becomes smaller, and the lowest temperature may become larger. Accordingly, the goods MAT may be frozen while maintaining the freshness of the goods MAT in the refrigerator 100 by using the RF signal.

Meanwhile, the main controller 310 may control the RF signal from the RF output device 190 to be output, from the time when the temperature of the goods MAT falls. Accordingly, the goods MAT may be frozen while maintaining the freshness of the goods MAT in the refrigerator 100 by using the RF signal.

Meanwhile, when the maintaining period within a predetermined temperature range of the goods MAT is greater than or equal to an allowable period, the main controller 310 turns off the RF output device 190, and may control to supply the cold air FAr supplied to the cooling chamber FRM in the cavity CAV. Accordingly, the goods MAT may be frozen while maintaining the freshness of the goods MAT in the refrigerator 100 by using the RF signal.

Meanwhile, the main controller 310 is configured to output the RF signal n to the cavity CAV when there is an operation input signal for the RF output device 190 while the goods MAT is frozen. It is preferable that the power of the RF signal output at the time when freezing the goods MAT is greater than the power of the RF signal output before freezing the MAT. Accordingly, the goods MAT may be frozen while maintaining the freshness of the goods MAT in the refrigerator 100 by using the RF signal.

Meanwhile, the frequency of the RF signal is preferably between 13.56 MHz to 433 MHz. Accordingly, the movement of water molecules in the goods MAT by the RF signal becomes active, so that the goods MAT can be frozen while maintaining the freshness of the goods MAT.

Meanwhile, the main controller 310 controls the RF signal of a first power to be output during a scan section, determines the type of the goods MAT based on the RF signal reflected during the scan section and, after the end of the scan section, may control the RF signal of the second power set based on the determined type of the goods MAT to be output. Accordingly, the goods MAT may be frozen while efficiently maintaining the freshness of the goods MAT in the refrigerator 100 by using the RF signal.

Meanwhile, among a cooling section, an idle section, a pre-defrost cooling section, a defrost section, a post-defrost idle section, a post-defrost cooling section, the main controller 310 may control the output of the RF signal in the cooling section, the pre-defrost cooling section, or the post-defrost cooling section to be larger than the output in the idle section, the defrost section, or the post-defrost idle section. Accordingly, the goods MAT may be frozen while maintaining the freshness of the goods MAT in the refrigerator 100 by using the RF signal.

Meanwhile, the main controller 310 may control the output of the RF signal to decrease or stop in the defrost section or during a door (DOR) load response operation, and control the output of the RF signal to increase after the defrost section or the end of the load response operation when the door (DOR) is opened. Accordingly, the goods MAT may be frozen while maintaining the freshness of the goods MAT in the refrigerator 100 by using the RF signal.

Meanwhile, the main controller 310 may output the RF signal, and then control the power of the RF signal to decrease during the defrost section, and control the power of the RF signal to increase when the defrost section is terminated. Accordingly, the goods MAT may be frozen while maintaining the freshness of the goods MAT in the refrigerator 100 by using the RF signal.

Meanwhile, when the door DOR of the cooling chamber FRM or the cavity CAV is opened, the main controller 310 may control to stop the output of the RF signal in operation. Thus, power consumption can be reduced.

Meanwhile, in the state where the cooling chamber FRM or the door DOR of the cavity CAV is closed, the main controller 310 may control to output the RF signal, when a temperature of the cooling chamber FRM is equal to or lower than a first temperature, and the temperature in the cavity CAV is equal to or lower than a second temperature higher than first temperature. Accordingly, the goods MAT may be frozen while maintaining the freshness of the goods MAT in the refrigerator 100 by using the RF signal.

Meanwhile, the main controller 310 determines the state of the goods MAT in the cavity CAV while the RF signal is output, and may change the power of the RF signal, continuously output the RF signal, or stop the RF signal based on the state of the goods MAT. Accordingly, the goods MAT may be frozen while maintaining the freshness of the goods MAT in the refrigerator 100 by using the RF signal.

Meanwhile, the main controller 310 may control to stop the output of the RF signal, when the temperature of the cooling chamber FRM is greater than the first temperature or when the temperature in the cavity CAV is greater than the second temperature. Accordingly, the goods MAT may be frozen while maintaining the freshness of the goods MAT in the refrigerator 100 by using the RF signal.

Meanwhile, the RF output device 190 includes a first plate AND and a second plate CAT disposed in the cavity CAV. The RF output device 190 may further include at least one of a signal detector ED for detecting the RF signal reflected from goods MAT in the cavity CAV, a temperature detector TD for detecting the temperature in the cavity CAV, and a camera CAM for photographing the goods MAT in the cavity CAV. Accordingly, through a feedback of the RF signal output, the goods MAT may be frozen while efficiently maintaining the freshness of the goods MAT in the refrigerator 100.

Meanwhile, the main controller 310 determines whether the goods MAT exists in the cavity CAV, based on a signal from at least one of the signal detector ED, the temperature detector TD, and the camera CAM. When it is determined that the goods MAT exists in the cavity CAV, if the temperature of the cooling chamber FRM is equal to or lower than a first temperature, and the temperature in the cavity CAV is equal to or lower than a second temperature higher than the first temperature, the main controller 310 may control to output the RF signal. Accordingly, the goods MAT may be frozen while maintaining the freshness of the goods MAT in the refrigerator 100 by using the RF signal. Meanwhile, the main controller 310 determines whether the goods MAT exists in the cavity CAV, based on the input signal, or determines whether the goods MAT exists in the cavity CAV, based on a signal from at least one of the signal detector ED, the temperature detector TD, and the camera CAM. When it is determined that the goods MAT exists in the cavity CAV, if the temperature of the cooling chamber FRM is equal to or lower than a first temperature, and the temperature in the cavity CAV is equal to or lower than a second temperature higher than the first temperature, the main controller 310 may control to output the RF signal. Accordingly, the goods MAT may be frozen while maintaining the freshness of the goods MAT in the refrigerator 100 by using the RF signal.

Meanwhile, the RF output device 190a of FIG. 5A may be disposed in the cooling chamber FRM, may be disposed inside or outside the cavity CAV, and may output the RF signal into the cavity CAV.

FIG. 5B is a diagram illustrating an RF output device according to another embodiment of the present invention.

Referring to the drawing, the RF output device 190b according to another embodiment of the present invention may include a cavity CAV disposed in the cooling chamber FRM.

The RF output device 190b according to another embodiment of the present invention is similar to the RF output device 190a of FIG. 5A, but there is a difference in that the cavity CAV is formed of a drawer DRA and a basket BSK.

A rail member (RALa, RAlb) for coupling with the drawer DRA is disposed in the basket BSK, and the drawer DRA may be moved back and forth by the coupling of the rail member (RALa, RAlb). Accordingly, the door DOR as shown in FIG. 5A is omitted.

Meanwhile, the RF output device 190*b* may include a first plate AND and a second plate CAT are disposed inside the cavity CAV or are disposed in the cavity CAV disposed outside.

In particular, in the drawing, it is illustrated that the first plate AND is disposed in the basket BSK, and the second plate CAT is disposed below the drawer DRA.

Meanwhile, the goods MAT is disposed below the drawer DRA or on the second plate CAT.

Meanwhile, the first plate AND may be electrically connected to the RF signal transmitter 312.

Meanwhile, in a state where the goods MAT is positioned on the second plate CAT or in the cavity CAV, when an electrical signal is applied to at least one of the first plate AND and the second plate CAT, the RF signal RFa may be output to the goods MAT inside the cavity CAV.

Meanwhile, it is preferable that the RF signal output from the RF output device 190*b* is output in a state the drawer DRA is coupled to the basket BSK and is closed. To this end, the RF output device 190*b* may further include a drawer DRA coupling detection sensor for detecting whether the drawer DRA is coupled.

Meanwhile, the RF signal transmitter 312 may be connected to the RF driver 195, and the RF driver 195 may be controlled by the main controller 310.

In addition, operation of the main controller 310 is omitted with reference to description of FIG. 5A.

Meanwhile, the RF output device 190*b* of FIG. 5A may be disposed in the cooling chamber FRM, may be disposed inside or outside the cavity CAV, and may output an RF signal into the cavity CAV.

FIG. 6 is a block diagram illustrating the inside of a RF driver of FIG. 4.

Referring to the drawing, the RF output device 190 may be connected to the RF signal transmitter 312, and the RF signal transmitter 312 may be connected to the RF driver 195.

The input device 220 may include a separate button for operating on or off the RF output device 190.

The display device 230 may display information related to the operating on or off of the RF output device 190.

The main controller 310 may control the RF output device 190 by using the RF driver 195.

The RF driver 195 may include a frequency oscillator 332, a level adjuster 334, an amplifier 336, a directional coupler 338, and a power detector 342.

The frequency oscillating unit 332 oscillates to output an RF signal of a corresponding frequency, by a frequency control signal from the main controller 310.

The frequency oscillator 322 may include a voltage controlled oscillator VCO. Based on the voltage level of the frequency control signal, the voltage controlled oscillator VCO oscillates a corresponding frequency. For example, as the voltage level of the frequency control signal becomes higher, the frequency oscillated and generated by the voltage controlled oscillator VCO becomes higher.

The level adjuster 334 may oscillate the frequency signal oscillated by the frequency oscillator 332 to output an RF signal with a corresponding power based on the power control signal. The level adjuster 334 may include a voltage controlled attenuator VCA.

Based on the voltage level of the power control signal, the voltage controlled attenuator VCA performs a correction operation so that an RF signal is output with a corresponding power. For example, as the voltage level of the power control signal becomes higher, the power level of the signal output from the voltage controlled attenuator VCA becomes higher.

The amplifier 336 may output a RF signal by amplifying the oscillated frequency signal, based on the frequency signal oscillated by the frequency oscillator 332 and the power control signal by the level adjuster 334.

As described above, the amplifier 336 may include a solid state power amplifier SSPA using a semiconductor device, and in particular, may include a Monolithic Microwave Integrated Circuits MMIC using a single substrate. Thus, the size thereof is reduced, and the integration of device can be achieved.

Meanwhile, the frequency oscillator 332, the level adjuster 334, and the amplifier 336, described above, may be implemented as a single unit, which may be referred to as a solid state power oscillator SSPO.

The directional coupler DC 338 transmits the RF signal amplified and output by the amplifier 336 to the RF signal transmitter 312. The RF signal output from the RF signal transmitter 312 is output to the goods in the RF output device 190.

Meanwhile, the RF signal that is not absorbed and reflected by the goods in the RF output device 190 may be input to the directional coupler 338 through the RF signal transmitter 312. The directional coupler 338 transfers the reflected RF signal to the main controller 310.

Meanwhile, the power detector 342 is disposed between the directional coupler 338 and the main controller 310, and detects the output power of the RF signal which is amplified and output by the amplifier 336 and transferred to the RF signal transmitter 312 via the directional coupler 338. The detected power signal is input to the main controller 310, and is used for a signal output efficiency calculation. Meanwhile, the power detector 342 may be implemented of a diode device, or the like to detect a power.

Meanwhile, the power detector 342 is disposed between the directional coupler 338 and the main controller 310, and detects the power of the reflected RF signal reflected by the RF output device 190 and received by the directional coupler 338. The detected power signal is input to the main controller 310, and is used for signal output efficiency calculation. Meanwhile, the power detector 342 may be implemented of a diode device, or the like to detect a power.

Meanwhile, the RF driver 195 is disposed between the amplifier 336 and the directional coupler 338, and may further include an isolation unit (not shown) for passing through the RF signal in the case of transferring the RF signal amplified by the amplifier 336 to the RF output device 190, and blocking the RF signal reflected from the RF output device 190. Here, the isolation unit (not shown) may be implemented of an isolator.

The main controller 310 may calculate signal output efficiency, based on the RF signal which is not absorbed and reflected by the goods among the RF signals emitted into the RF output device 190.

Meanwhile, when the plurality of RF signals are sequentially emitted into the RF output device 190, the main controller 310 calculates signal output efficiency for each frequency of the plurality of RF signals.

Meanwhile, the main controller 310 may control a RF signal output section to be divided into a scan section and a main operation section so as to output signal efficiently.

The main controller 310 may sequentially output a plurality of RF signals into the RF output device 190 during the scan section, and calculate signal output efficiency based on the reflected RF signal.

In addition, the main controller 310 may output RF signals having different output periods respectively or output only the RF signal having a certain frequency, in the main operation section, based on the signal output efficiency calculated in the scan section. Meanwhile, it is preferable that the power of the RF signal in the main operation section is significantly higher than the power of the RF signal in the scan section. Thus, power consumption can be reduced.

The main controller 310 may generate and output a frequency control signal to vary the output period of the RF signal based on the calculated signal output efficiency.

Meanwhile, the main controller 310 may control to output the RF signal of corresponding frequency, only when the signal output efficiency calculated for each frequency is equal to or greater than a set value.

The power supply 114 may boost the power input to the refrigerator 100 to a high voltage and output to the RF driver 195. The power supply 114 may be implemented of a high voltage transformer or an inverter.

FIG. 7 is a flowchart illustrating an operating method of a refrigerator according to an embodiment of the present invention, and FIGS. 8 to 14 are diagrams for explaining the operating method of FIG. 77.

First, referring to FIG. 7, the main controller 310 controls the RF output device 190 to be turned on according to an operation of the input device 220 or the like (S710).

Accordingly, the RF output device 190 is turned on so that the RF signal is output into the cavity CAV of the RF output device 190 (S720).

At this time, the cool air is supplied by the fan operation to the cooling chamber in which the cavity CAV of the RF output device 190 is positioned.

Meanwhile, in the present invention, it is assumed that the RF signal for moving the water molecules of the goods is output in order to maintain the freshness and freeze the goods in the cavity (CAV).

In particular, the frequency of the RF signal is preferably between 13.56 MHz and 433 MHz.

When the frequency of the RF signal is between 13.56 MHz and 433 MHz, as it is not 2.4 GHz for high-speed vibration of water molecules, the water molecule motion is performed in a range where an object is not heated. Thus, freezing of the goods is performed while maintaining freshness.

Meanwhile, it is determined whether the temperature of the goods in the cavity (CAV) of the RF output device 190 is within a certain range (S730), it is determined whether a maintenance period within the certain range is equal to or more than a allowable period (S740), and if applicable, the RF output device 190 is controlled to be turned off (S750). Cold air is controlled to be supplied into the cavity CAV of the RF output device 190 (S760).

FIG. 8A illustrates the goods MATa is positioned in the outside of the cavity CAV of the RF output device 190. For example, the goods MATa may be pork which is a kind of meat, in particular pork which is not frozen.

Meanwhile, referring to FIG. 8A, heat insulating material (Cha, CHb) may be attached to at least a portion of the inner surface or the outer surface of the cavity CAV.

In the drawing, it is illustrated that the heat insulating material (Cha, CHb) may be attached to the upper surface and the side surface of the cavity CAV. Alternatively, it is possible that the heat insulating material is attached to the front surface of the cavity CAV.

Accordingly, when the RF signal is output as the RF output device 190 is turned on, heat insulation is performed between the cavity CAV and the cooling chamber FRM, so that the temperature change between the cavity CAV and the cooling chamber FRM becomes small.

For example, cold air in the cooling chamber FRM may not be properly transmitted to the cavity CAV. As another example, the temperature rising due to the RF signal in the cavity CAV may not be properly transmitted to the cooling chamber FRM.

FIG. 8B illustrates that the door DOR of the RF output device 190 is opened to allow the goods MATA to enter the cavity CAV.

Next, FIG. 8C illustrates a state in which the goods MATa is placed in the cavity CAV. The RF output device 190 may be turned on automatically or by operation of the input device 220.

Accordingly, as shown in FIG. 8D, the RF signal RFa may be output in the direction of the goods MATA in the cavity CAV.

Meanwhile, based on the input signal, the main controller 310 may control at least one of an output period and an output power of the RF signal RFa to be varied.

Meanwhile, depending on the type of the goods MATa in the cavity CAV, depending on the amount of the goods MATa in the cavity CAV, the main controller 310 may control at least of the output period and the output power of the RF signal RFa to be varied.

To this end, the main controller 310 may perform a signal output efficiency calculation, based on the reflected signal of the output RF signal RFa.

For example, after outputting the RF signal of the first power during the scan section, the signal output efficiency calculation may be performed based on the reflected signal, during the scan section.

As the signal output efficiency becomes higher, the main controller 310 may determine that the amount of the goods MATa is small, or may determine the type of the goods MATa as goods that absorbs an RF signal well.

Accordingly, the main controller 310 can control the output period of the RF signal RFa to be smaller, or control the output power to be smaller, as the signal output efficiency becomes higher.

Meanwhile, after determining the type of the goods or the amount of the goods based on the signal output efficiency calculation in the scan section, the main controller 310 may output an RF signal having a second power much higher than the first power during the main operation section.

The output period or the level of power of the RF signal of the second power may be determined based on the signal output efficiency, as described above.

For example, as the signal output efficiency becomes higher, the output period of the RF signal of the second power becomes smaller, or the level of the second power decreases.

Next, FIG. 8E illustrates that as the RF output device 190 is turned off, the RF signal RFa is not output and cold air FAr is supplied into the cavity CAV.

For example, when the temperature of the goods MATa in the cavity CAV of the RF output device 190 is within a certain range, and when the maintaining period within a certain range is equal to or longer than an allowable period, the main controller 310 controls the RF output device 190 to be turned off. Then, the cool air is controlled to be supplied into the cavity CAV of the RF output device 190. Accordingly, the goods MATa is frozen rapidly regardless of freshness maintaining.

FIG. 9A shows the temperature waveform Wvma of the foods, the temperature waveform Wca of the cavity, and the temperature waveform Wra of the cooling chamber, respectively, when an RF signal having a power of 10 W is output in the direction of the goods MATa.

Referring to the drawing, the main controller 310 controls an operation to be divided into a first section P1a in which the temperature of the goods MAT decreases as an RF signal is outputted to the goods MAT in the cavity CAV, and a second section P2a in which the temperature of the goods MAT increases after the first section P1a and maintains within a predetermined temperature range.

Meanwhile, the main controller 310 may control to perform a third section P3a where the temperature of the goods MAT falls after the second section P2a, by outputting an RF signal to the goods MAT in the cavity CAV.

Meanwhile, the main controller 30 may control to perform a fourth section P4a in which the goods MAT is frozen, after the third section P3a.

During the first section P1a to the fourth section P4a, the temperature of the cooling chamber varies somewhat, but may be defined as substantially uniform, in comparison with the temperature waveform WA/ma of the goods and the temperature waveform Wca of the cavity.

Meanwhile, when viewing the temperature waveform WA/ma of the goods MAT and the temperature waveform Wca of the cavity CAV, it can be seen that the temperature drops continuously, due to the cold air FAr supplied to the cooling chamber FRM, during the first section P1a. At this time, the temperature of the goods MAT becomes higher than the temperature of the cavity CAV.

Next, when the temperature waveform Wvma of the goods MAT is viewed in the end of the first section P1a, the temperature rises rapidly due to the phase change. At this time, the cavity CAV has a temperature change without phase change.

Meanwhile, when the goods MAT is pork, the temperature of the goods MAT in the end of the first section P1a may be approximately ?2.7° C., and the temperature of cavity CAV in the end of the first section P1a may be approximately −6.7° C.

Meanwhile, during the second section P2a, the temperature of the goods MAT is substantially uniformly maintained due to the phase change. At this time, during the second section P2a, the temperature of the cavity CAV drops.

That is, when the goods MAT is positioned in the cavity CAV, the temperature of the goods MAT falls during the first section P1a based on the cold air FAr supplied into the cooling chamber FRM, and may be maintained within a predetermined temperature range based on the RF signal from the RF output device 190 during the second section P2a.

During the second section P2a, the temperature of the goods MAT is higher than the temperature of the goods MAT in the end of the first section P1a. For example, it may be approximately −0.9° C.

Meanwhile, it is preferable that the temperature in the second section P2a is higher than the lowest temperature at the time of the fall of the goods MAT in the first section P1a. Accordingly, the goods MAT may be frozen while maintaining the freshness of the goods MAT in the refrigerator 100 by using the RF signal.

Next, when the phase change of the goods MAT is finished, the third section P3a where the temperature of the goods MAT falls again may be performed due to the cold air FAr supplied to the cooling chamber FRM.

During the third section P3a, the temperature of the cavity CAV continues to fall.

Meanwhile, the difference between the temperatures of the goods MAT and the cavity CAV during the second section P2a becomes greater than the difference between the temperatures of the goods MAT and the cavity CAV during the third section P3a.

In particular, due to the phase change of the goods MAT, the difference between the temperatures of the goods MAT and the cavity CAV becomes greatest during the second section P2a.

Next, during the fourth section P4a, the goods MAT is frozen, and the temperature of the goods MAT is approximately uniformly maintained. The temperature of the goods MAT may be approximately −7.5° C.

FIG. 9B shows the temperature waveform Wvmb of the foods, the temperature waveform Wcb of the cavity, and the temperature waveform Wrb of the cooling chamber, respectively, when an RF signal having a power of 20 W is output in the direction of the goods MATa.

Referring to the drawing, the main controller 310 may control to perform a first section P1b in which the temperature of the goods MAT decreases by outputting an RF signal to the goods MAT in the cavity CAV, a second section P2b in which the temperature of the goods MAT increases after the first section P1b and maintains within a predetermined temperature range, a third section P3b in which the temperature of the goods MAT drops after the second section P2b, and a fourth section P4b in which the goods MAT is frozen after the third section P3b.

Meanwhile, during operation of the RF output device 190, the cold air FAr in the cooling chamber FRM may be supplied into the cavity CAV.

Meanwhile, when the RF output device 190 is operated, the temperature of the cooling chamber FRM may increase than before the RF output device 190 is operated.

During the first section P1b to the fourth section P4b, the temperature of the cooling chamber varies somewhat, but may be defined as substantially uniform, in comparison with the temperature waveform Wvmb of the goods and the temperature waveform Wcb of the cavity.

Meanwhile, when the temperature waveform Wvmb of the goods MAT and the temperature waveform Wcb of the cavity CAV are viewed, it can be seen that the temperature drops continuously due to the cold air FAr supplied to the cooling chamber FRM during the first section P1b. At this time, the temperature of the goods MAT becomes higher than the temperature of the cavity CAV.

Next, when viewing the temperature waveform Wvmb of the goods MAT, in the end of the first section P1b, the temperature is rapidly increased due to the phase change. At this time, the temperature of the cavity CAV decreases without phase change.

Meanwhile, when the goods MAT is pork, the temperature of the goods MAT in the end of the first section P1b may be approximately ?1.8° C., and the temperature of the cavity CAV in the end of the first section P1b may be approximately −5.8° C.

Meanwhile, during the second section P2b, the temperature of the goods MAT is substantially uniformly maintained due to the phase change. At this time, during the second section P2b, the cavity CAV temperature drops.

During the second section P2b, the temperature of the goods MAT becomes higher than the temperature of the goods MAT in the end of the first section P1b. For example, it may be approximately −0.7° C.

Next, when the phase change of the goods MAT is ended, the third section P3b in which the temperature of the goods MAT falls again may be performed due to the cold air FAr supplied to the cooling chamber FRM.

During the third section P3b, the temperature of the cavity CAV continues to fall.

Meanwhile, during the third section P3b, the difference between the temperatures of the goods MAT and the cavity CAV during the second section P2b becomes greater than the difference between the temperatures of the goods MAT and the cavity CAV during the third section P3b.

In particular, due to the phase change of the goods MAT, the difference between the temperatures of the goods MAT and the cavity CAV becomes greatest during the second section P2b.

Next, during the fourth section P4b, the goods MAT is frozen, and the temperature of the goods MAT is substantially uniformly maintained. The temperature of the goods MAT may be approximately −2° C.

FIGS. 9A and 9B, as the power of the RF signal output from the RF output device 190 increases, the first section P1b may become longer, the start point of the second section P2b may become delayed, or the second section P2b may become longer.

In comparison with FIG. 9A, the first section P1b of FIG. 9B may be longer, the start point of the second section P2b may become delayed, and the second section P2b may become longer. Accordingly, the freshness of the goods MAT in the refrigerator 100 may be maintained by using the RF signal.

In addition, comparing FIG. 9A and FIG. 9B, as the power of the RF signal output from the RF output device 190 increases, the freezing temperature of the goods MAT in the third section P3a may increase. In the drawing, it is illustrated that it increases to approximately −2° C. from −7.5° C. which is the freezing temperature of FIG. 9A. Accordingly, the freshness of the goods MAT in the refrigerator 100 may be maintained by using the RF signal. In particular, the goods MAT may be frozen while maintaining the freshness of the goods MAT.

Meanwhile, comparing FIG. 9A and FIG. 9B, the magnitude of the falling slope of the goods in the first section becomes smaller, as the power of the RF signal increases.

FIG. 9A illustrates that the falling slope of the goods of the first section is Slaa, and the falling slope of the cavity is Slab. FIG. 9B illustrates that the magnitude of the falling slope of the goods MAT of the first section is Slba smaller than Slaa, and the falling slope of the cavity is Slbb smaller than Slab.

Meanwhile, the falling slope or the lowest temperature at the time when the goods MAT temperature falls in the first section P1a may change based on the power of the RF signal from the RF output device 190. In particular, as the power of the RF signal increases, the magnitude of the falling slope may decrease or the lowest temperature may increase. Accordingly, the goods MAT may be frozen while maintaining the freshness of the goods MAT in the refrigerator 100 by using the RF signal.

Meanwhile, unlike FIGS. 9A and 9B, when no RF signal is output into the cavity CAV, it can be known by experiment that the temperature of the goods MAT and the temperature of the cavity CAV, in the end of the first section, are almost the same.

Meanwhile, as shown in FIGS. 9A and 9B, when the RF signal is output into the cavity CAV from when the temperature of the goods MAT falls, i.e., from the first section, a difference between the temperatures of the goods MAT and the cavity CAV may occur.

In particular, in the end of the first section, the difference between the temperature of the goods MAT and the temperature of the cavity CAV is approximately 3° C. or 4° C.

As described above, the difference between the temperature of the goods MAT and the temperature of the cavity CAV occurs immediately before the phase change occurs, because the water molecules in the goods MAT moves based on the RF signal.

Accordingly, when the RF signal is output into the cavity CAV, the temperature, in the end of the first section immediately before the phase change, rises, in comparison with the case where the RF signal is not output. Thus, the phase change can be accomplished, while maintaining the freshness of the goods MAT. Then, the goods may be frozen while maintaining the freshness through the third and fourth sections.

Meanwhile, the main controller 310 according to an embodiment of the present invention may control the RF signal from the RF output device 190 to be output, before the lowest temperature point in the first section P1a. Accordingly, the goods MAT may be frozen while maintaining the freshness of the goods MAT in the refrigerator 100 by using the RF signal.

Meanwhile, after the refrigerator 100 is turned on, the temperature of the cavity CAV may continue to fall until the temperature of the goods MAT maintains within a predetermined temperature range. Accordingly, the goods MAT may be frozen while maintaining the freshness of the goods MAT in the refrigerator 100 by using the RF signal.

Meanwhile, when the maintaining period within the predetermined temperature range of the goods MAT is equal to or more than an allowable period, as shown in FIG. 8E, the main controller 310 according to an embodiment of the present invention turns off the RF output device 190, and controls the cold air FAr supplied into the cooling chamber FRM to be supplied into the cavity CAV. Accordingly, the goods MAT may be frozen while maintaining the freshness of the goods MAT in the refrigerator 100 by using the RF signal.

Meanwhile, the main controller 310 according to an embodiment of the present invention may control the RF signal to be output into the cavity CAV, when there is an operation input signal for the RF output device 190 in the state where the goods MAT is frozen. It is preferable that the power of the RF signal output upon freezing the goods MAT is greater than the power of the RF signal output before freezing the goods MAT. Accordingly, the goods MAT may be frozen while maintaining the freshness of the goods MAT in the refrigerator 100 by using the RF signal.

Meanwhile, the main controller 310 according to an embodiment of the present invention controls the RF signal of the first power to be output during the scan section, and determines the type of the goods MAT based on the RF signal reflected during the scan section, and may control the RF signal of the second power set based on the determined type of the goods MAT to be output, after the end of the scan section. Accordingly, the goods MAT may be frozen while efficiently maintaining the freshness of the goods MAT in the refrigerator 100 by using the RF signal. This will be described with reference to FIG. 10.

FIG. 10 is a diagram illustrating a scan section Pscan and a main operation section Pmain of the RF output device 190.

Referring to the drawing, the main controller 310 controls the RF signal of the first power PWa to be output in the scan section Pscan, and controls the RF signal of the second power PWb that is larger than the first power PWa to be output in the main operation section Pmain.

The main controller 310 calculates the signal output efficiency based on the RF signal reflected during the scan section Pscan, and may determine the type of the goods MAT or the amount of the goods based on the calculated signal output efficiency.

In addition, the main controller 310 may change the power of the output RF signal or vary the output period of the RF signal, based on the determined type or amount of the goods MAT, in the main operation section Pmain. Accordingly, the RF signal is adaptively output based on the type or amount of the foods, so that the freshness of the goods can be efficiently maintained.

Meanwhile, it is preferable that the frequency of the RF signal ranges from 13.56 MHz to 433 MHz. Accordingly, the movement of water molecules in the goods MAT due to the RF signal becomes active, so that the goods MAT can be frozen while maintaining the freshness of the goods MAT. This will be described with reference to FIG. 11.

FIG. 11 illustrates a range of frequency output from the RF output device 190.

Referring to the drawing, it is preferable that the frequency range fscop of the RF signal is between 13.56 MHz and 433 MHz.

For example, when the frequency of the RF signal is less than 13.56 MHz, the movement of the water molecules in the goods can not be performed smoothly, and if it exceeds 433 MHz, the movement of the water molecules in the goods is too much actively performed, thereby causing the temperature increase of the foods.

Therefore, in the present invention, the frequency fscop of the RF signal used in the RF output device 190 ranges from 13.56 MHz to 433 MHz.

Meanwhile, as described above, depending on the type or amount of the foods, the frequency of the RF signal may change within 13.56 MHz to 433 MHz.

For example, as goods have less water molecule movement or have greater amount, the frequency of the RF signal may become higher. Accordingly, the movement of water molecules in the goods MAT by the RF signal becomes active, so that the goods MAT can be frozen while maintaining the freshness of the goods MAT.

Meanwhile, during the operation of the RF output device 190, the power consumption consumed in the compressor 112 may increase than before the operation of the RF output device 190. Accordingly, the goods MAT may be frozen while maintaining the freshness of the goods MAT in the refrigerator 100 by using the RF signal. This will be described with reference to FIG. 12.

FIG. 12 illustrates that the power consumed by the compressor 112 before the operation of the RF output device 190 is Powa, and the power, which is consumed by the compressor 112 while the RF output device 190 is operating, is Powb that is larger than Powa.

When the RF output device 190 is disposed in the freezer compartment, the compressor 112 operates to maintain a set temperature ?18° C. of the freezer compartment, and in particular, when the RF output device 190 operates, the temperature in the freezer compartment may be partly increased due to heat exchange, in spite of a heat insulating material (CHa, CHb), and the like.

Accordingly, in order to maintain the set temperature ?18° C. of the freezer compartment, the power consumed by the compressor 112 is further increased during the operation of the RF output device 190.

Meanwhile, among a cooling section, an idle section, a pre-defrost cooling section, a defrost section, a post-defrost idle section, a post-defrost cooling section, the refrigerator 100 may operate by dividing into a cooling section, a pre-defrost cooling section, or a post-defrost cooling section, or the like.

FIG. 13 is a timing diagram illustrating power consumption in an operation section and a corresponding operation section of the refrigerator.

First, the first section T1 is a cooling section, and represents a section in which the compressor 112 is turned on and the fan 144 is turned on and operates. In the initial stage of a cooling section T1, the second power L2 is consumed to start the compressor 112, but thereafter, the first power L1 lower than the second power L2 may be consumed.

Next, a second section T2 is an idle section, and represents a section in which the compressor 112 is turned off and the fan 144 is also turned off. Meanwhile, in the initial section of the idle section, the compressor 112 is turned off, but the fan 144 may operate, and then the fan 144 may also be turned off.

Next, a third section T3 is a pre-defrost cooling section, and represents a section in which the compressor 112 is turned on and the fan 144 is also turned on to operate. This section represents a section for accomplishing pre-cooling, before the defrost section, in order to previously prevent the rising of the internal temperature of the refrigerator as the power consumption increases in a defrost section T4. During the pre-defrost cooling section T3, a first power L1 may be consumed.

In addition, although not shown in the drawing, between the third section T3 and the fourth section T4, the refrigerant in the evaporator 124 can be removed. In the fourth section T4, i.e., in the defrost section, when the refrigerant remains in the evaporator 124, an operating time of the defrost heater 330 may be long. In order to shorten the operation time of the defrost heater 330, the controller 310 may control the refrigerant in the evaporator 124 to be removed. This operation may be referred to as pump down.

Next, the fourth section T4 represents the defrost section. The defrost heater 330 operates in the defrost section.

Next, a fifth section T5 represents a post-defrost idle section. Accordingly, the compressor 112 is turned off and the fan 144 is also turned off. Meanwhile, in the initial stage of the idle section, the compressor 112 is turned off, but the fan 144 may operate, and then the fan 144 may also be turned off.

Next, a sixth section T6 is a post-defrost cooling section, and represents a section in which the compressor 112 is turned on and the fan 144 is also turned on and operates. In the initial stage of the cooling section T6, a second power L2 is consumed to start the compressor 112, but thereafter, the first power L1 lower than the second power L2 may be consumed.

Meanwhile, the main controller 310 based on the embodiment of the present invention may control the output of the RF signal in the cooling section T1, the idle section T2, the pre-defrost cooling section T3, the defrost section T4, the post-defrost idle section T5, the cooling section T1 in post-defrost cooling section T6, the pre-defrost cooling section T3, or the post-defrost cooling section T6 to be larger than the output in the idle section T2, the defrost section T4, or in the post-defrost idle section T5. Accordingly, the goods MAT may be frozen while maintaining the freshness of the goods MAT in the refrigerator 100 by using the RF signal.

Meanwhile, the main controller 310 according to an embodiment of the present invention may control the output of the RF signal to decrease or stop in the defrost section T4 or during a door (DOR) load response operation, and control the output of the RF signal to increase after the defrost section or the end of the load response operation when the door (DOR) is opened. Accordingly, the goods MAT may be frozen while maintaining the freshness of the goods MAT in the refrigerator 100 by using the RF signal.

Meanwhile, the main controller 310 according to an embodiment of the present invention outputs an RF signal and controls the power of the RF signal to decrease when the defrost section T4 is performed, and may control the power of the RF signal to increase when the defrost section T4 is ended. Accordingly, the goods MAT may be frozen while maintaining the freshness of the goods MAT in the refrigerator 100 by using the RF signal.

FIG. 14 is a diagram illustrating an RF output device 190c according to another embodiment of the present invention.

Referring to the drawing, similarly to the RF output device 190a of FIG. 5A, the RF output device 190c of FIG. 14 includes the first plate AND and the second plate CAT disposed in the cavity CAV.

Meanwhile, unlike the RF output device 190a of FIG. 5A, the RF output device 190c of FIG. 14 may further include at least one of a signal detector ED for detecting an RF signal reflected from the goods MAT in the cavity CAV, a temperature detector TD for detecting a temperature in the cavity CAV, and a camera CAM for photographing the goods MAT in the cavity CAV.

Accordingly, through the feedback of the RF signal output, it is possible to efficiently freeze the goods MAT while maintaining the freshness of the goods MAT in the refrigerator 100.

For example, the main controller 310 may determine whether the goods MAT exists in the cavity, based on a signal from at least one of the signal detector ED, the temperature detector TD, and the camera CAM. Then, in the state where it is determined that the goods MAT is positioned in the cavity CAV, when the temperature of the cooling chamber FRM is equal to or below a first temperature, and the temperature in the cavity CAV is equal to or below a second temperature higher than the first temperature, the main controller 310 may control to output the RF signal. Accordingly, the goods MAT may be frozen while maintaining the freshness of the goods MAT in the refrigerator 100 by using the RF signal.

FIG. 15 is a flowchart illustrating an operating method of a refrigerator according to another embodiment of the present invention.

Referring to the drawing, the main controller 310 based on the embodiment of the present invention controls to perform the freezer compartment operation (S1510). To this end, the compressor 112 may be driven, and the fan 144 may be operated to supply the cold air FAr to the freezer compartment FRM.

Next, the main controller 310 determines whether the door DOR of the freezer compartment or the cavity CAV is opened (S1515).

The main controller 310 controls to turn off the RF output device 190 when the door is opened (S1550). That is, it may control to stop the output of the RF signal. Accordingly, power consumption can be reduced.

Meanwhile, when the door is closed, the main controller 310 determines whether the temperature of the freezer compartment is lower than or equal to the first temperature (S1520), and controls the RF output device 190 to be turned off when the temperature of the freezer compartment is greater than the first temperature (S1550). That is, it may control to stop the output of the RF signal. Accordingly, power consumption can be reduced.

Meanwhile, when the temperature of the freezer compartment is lower than or equal to the first temperature in the state where the door is closed, the main controller 310 determines whether the temperature in the cavity CAV is lower than or equal to the second temperature higher than the first temperature (S1525). When the temperature in the cavity CAV is greater than the second temperature, the main controller 310 controls the RF output device 190 to be turned off (S1550). That is, it may control to stop the output of the RF signal. Accordingly, power consumption can be reduced.

Meanwhile, in the state where the door is closed, when the temperature of the freezer compartment is below or equal to the first temperature, and the temperature in the cavity CAV is below or equal to the second temperature higher than the first temperature, the main controller 310 may control to output the RF signal (S1530). Accordingly, the goods MAT may be frozen while maintaining the freshness of the goods MAT in the refrigerator 100 by using the RF signal.

In addition, the main controller 310 may determine the state of the foods, based on a reflected signal of the RF signal output into the cavity CAV, temperature information from the temperature detector TD for detecting the temperature in the cavity CAV, or image information from the camera CAM for photographing the goods MAT in the cavity CAV (S1540).

For example, the type of the foods, the amount of the foods, the temperature of the foods, and the like can be determined directly or indirectly. Accordingly, the main controller 310 may change the output period, the output power, or the output frequency of the RF signal, when the RF signal is output.

Meanwhile, the main controller 310 determines whether the goods MAT exists in the cavity CAV based on the input signal, or determines whether the goods MAT exists in the cavity CAV based on a signal from at least one of the signal detector ED, the temperature detector TD, and the camera CAM. When it is determined that the goods MAT exists in the cavity CAV, if the temperature of the cooling chamber FRM is below or equal to the first temperature, and if the temperature in the cavity CAV is below or equal to the second temperature higher than the first temperature, the main controller 310 may control to output the RF signal.

As a result, the goods MAT may be frozen while maintaining the freshness of the goods MAT in the refrigerator 100 by using the RF signal.

Meanwhile, the main controller 310 determines the state of the goods MAT in the cavity CAV while the RF signal is being output, and may change the power of the RF signal, or continuously output or stop the RF signal, based on the state of the goods MAT. Accordingly, the goods MAT may be frozen while maintaining the freshness of the goods MAT in the refrigerator 100 by using the RF signal.

Meanwhile, the main controller 310 may control to stop the output of the RF signal, when the temperature of the freezer compartment is greater than the first temperature or when the temperature in the cavity CAV is greater than the second temperature. Accordingly, the RF output device can be efficiently driven.

The present invention relates to a refrigerator, and more particularly, can be applied to a refrigerator capable of maintaining the freshness of goods in the refrigerator by using an RF signal.

The refrigerator based on the present invention is not limited to the configuration and method of the embodiments described above, but the embodiments may be configured by selectively combining all or part of each embodiment so that various modifications can be made.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto.

MODE FOR INVENTION

Various embodiments have been described in the best mode for carrying out the invention.

INDUSTRIAL APPLICABILITY

The present invention is applicable to a refrigerator, and more particularly, to a refrigerator for maintaining the freshness of goods in the refrigerator by using a RF signal.

The invention claimed is:

1. A refrigerator comprising:
a compressor for compressing refrigerant;
an evaporator for performing heat exchange using the refrigerant compressed by the compressor;
a fan to operate for supplying cold air generated by the heat exchange in the evaporator to a cooling chamber;
an RF output device disposed in the cooling chamber, and for outputting an RF signal into a cavity in the cooling chamber; and
a controller for controlling the RF output device,
wherein the controller is configured to output the RF signal to goods in the cavity, and to operate in a first period in which a temperature of the goods falls, and a second period in which the temperature of the goods increases after the first period and maintains,
wherein when the RF output device operates, a temperature of the cavity is higher than a temperature of other area in the cooling chamber,
wherein the controller is configured to:
output a RF signal of a first power during a scan period,
determine a type of the goods based on a reflected RF signal during the scan period, and output an RF signal of a second power set based on the determined type of the goods after end of the scan period.

2. The refrigerator of claim 1, wherein the controller is configured to control to increase the first period, to delay a start time of the second period, or to increase the second period, as power of the RF signal output from the RF output device increases.

3. The refrigerator of claim 1, wherein the controller is configured to output the RF signal to the goods in the cavity, and to further perform in a third period in which the temperature of the goods falls after the second period.

4. The refrigerator of claim 3, wherein a freezing temperature of the goods in the third period decreases, as power of the RF signal output from the RF output device increases.

5. The refrigerator of claim 1, wherein a heat insulating material is attached to at least a portion of an inner surface or an outer surface of the cavity.

6. The refrigerator of claim 1, wherein the controller is configured to change at least one of an output period and an output power of the RF signal based on a type of the goods or an input signal.

7. The refrigerator of claim 1, wherein the controller is configured to output the RF signal from the RF output device before a lowest temperature point in the first period.

8. The refrigerator of claim 1, wherein a falling slope or a lowest temperature at a time when the temperature of goods in the first period falls is changed based on power of the RF signal from the RF output device.

9. The refrigerator of claim 1, wherein the controller is configured to turn off the RF output device, when a maintaining period within the predetermined temperature range of the goods is equal to or greater than a predetermined period, and to output cool air supplied into the cooling chamber into the cavity.

10. The refrigerator of claim 1, wherein the controller is configured to output the RF signal into the cavity in response to an operation input signal for the RF output device in a state where the goods is frozen,
wherein a power of the RF signal output when the goods is frozen is greater than a power of the RF signal output before the goods is frozen.

11. The refrigerator of claim 1, wherein, among a cooling period, an idle period, a pre-defrost cooling period, a defrost period, a post-defrost idle period, a post-defrost cooling period, the controller is configured to control an output of the RF signal in the cooling period, the pre-defrost cooling period, or the post-defrost cooling period to be larger than an output in the idle period, the defrost period, or the post-defrost idle period.

12. The refrigerator of claim 1, wherein the controller is configured to control the output of the RF signal to decrease or stop during a defrost period or a door load response operation, and
control the output of the RF signal to increase after termination of the defrost period or the load response operation when a door is opened.

13. The refrigerator of claim 1, wherein the controller is configured to output the RF signal, decrease a power of the RF signal when a defrost period is performed, and increase the power of the RF signal when the defrost period is terminated.

14. The refrigerator of claim 1, wherein the controller is configured to control to stop the output of the RF signal in operation, when a door of the cooling chamber or the cavity is opened.

15. The refrigerator of claim 1, wherein the controller is configured to control to output the RF signal, when the temperature of the cooling chamber is lower than or equal to a first temperature, and the temperature of the cavity is lower than or equal to a second temperature higher than the first temperature, in a state where a door of the cooling chamber or the cavity is closed.

16. The refrigerator of claim 15, wherein the RF output device comprises a first plate and a second plate disposed in the cavity,
wherein the RF output device further comprises at least one of:
a signal detector for detecting an RF signal reflected from the goods in the cavity;
a temperature detector for detecting a temperature in the cavity; or
a camera for photographing the goods in the cavity.

17. The refrigerator of claim 16, wherein the controller is configured to determine whether the goods exists in the cavity based on at least one signal from at least one of the signal detector, the temperature detector, or the camera, and control to output the RF signal, when the temperature of the cooling chamber is equal to or lower than the first temperature and the temperature in the cavity is equal to or lower than the second temperature higher than the first temperature, in a state where it is determined that the goods is positioned in the cavity.

18. A refrigerator comprising:
a compressor for compressing refrigerant;
an evaporator for performing heat exchange using the refrigerant compressed by the compressor;
a fan to operate for supplying cold air generated by the heat exchange in the evaporator to a cooling chamber;
an RF output device disposed in the cooling chamber, and for outputting an RF signal into a cavity; and
a controller for controlling the RF output device,
wherein the controller is configured to control to output the RF signal, in a state where the cooling chamber or a door of the cavity is closed, when a temperature of the cooling chamber is lower than or equal to a first temperature, and the temperature in the cavity is lower than or equal to a second temperature higher than the first temperature,
wherein the controller is configured to:
output a RF signal of a first power during a scan period,
determine a type of the goods based on a reflected RF signal during the scan period, and output an RF signal of a second power set based on the determined type of the goods after end of the scan period.

19. The refrigerator of claim 18, wherein the controller is configured to determine whether goods exists in the cavity based on an input signal,
determine whether goods exists in the cavity based on at least one signal from at least one of the signal detector, the temperature detector, or the camera, and control to output the RF signal, in a state where it is determined that the goods is positioned in the cavity, when the temperature of the cooling chamber is equal to or lower than the first temperature, and the temperature in the cavity is lower than or equal to the second temperature higher than the first temperature.

20. The refrigerator of claim 9, wherein the controller is configured to output the RF signal into the cavity in response to an operation input signal for the RF output device in a state where the goods is frozen,
wherein a power of the RF signal output when the goods is frozen is greater than a power of the RF signal output before the goods is frozen.

* * * * *